United States Patent
Sueshige et al.

(10) Patent No.: US 6,523,283 B2
(45) Date of Patent: Feb. 25, 2003

(54) OVERLOAD PROTECTING DEVICE FOR SNOW REMOVING MACHINE

(75) Inventors: Hiroshi Sueshige, Wako (JP); Kenji Kuroiwa, Wako (JP); Tomoaki Ishikawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 26 days.

(21) Appl. No.: 09/916,524

(22) Filed: Jul. 27, 2001

(65) Prior Publication Data

US 2002/0014132 A1 Feb. 7, 2002

(30) Foreign Application Priority Data

Jul. 31, 2000 (JP) ........................................ 2000-232424
Apr. 19, 2001 (JP) ........................................ 2001-121466

(51) Int. Cl.⁷ .................................................. E01H 5/09
(52) U.S. Cl. ........................................ 37/245; 477/178
(58) Field of Search ........................ 37/245, 244, 249, 37/253, 254; 477/178, 177; 192/56.1

(56) References Cited

U.S. PATENT DOCUMENTS

| 5,000,302 A | * | 3/1991 | Takeshita ................... 192/17 R |
| 5,101,911 A | * | 4/1992 | Lee et al. ..................... 172/48 |
| 5,156,244 A | * | 10/1992 | Pyles et al. .................. 477/178 |
| 5,398,431 A | * | 3/1995 | Beihoffer et al. ............. 37/249 |
| 5,419,745 A | * | 5/1995 | Moolenaar et al. ........... 477/20 |
| 5,545,109 A | * | 8/1996 | Hayakawa ................... 477/178 |
| 5,802,745 A | * | 9/1998 | Haseotes et al. ............... 37/234 |
| 6,212,799 B1 | * | 4/2001 | Gingerich et al. ............. 37/246 |
| 6,443,872 B1 | * | 9/2002 | Nakashima ................. 477/174 |

FOREIGN PATENT DOCUMENTS

| JP | 51034111 | | 8/1976 |
| JP | 2-183003 | * | 7/1990 |
| JP | 10-298939 | * | 11/1998 |
| JP | 2001-107329 | * | 4/2001 |
| JP | 2001-279627 | * | 10/2001 |
| JP | 2001-279629 | * | 10/2001 |
| JP | 2002-115223 | * | 4/2002 |

* cited by examiner

Primary Examiner—Victor Batson
(74) Attorney, Agent, or Firm—Adams & Wilks

(57) ABSTRACT

An overload protecting device assembled in an auger transmission is disclosed as including a worm wheel having its side wall formed with a plurality of wheel-side protruding segments, a boss member engaging with the wheel and fixedly coupled to an auger shaft for non-rotating relationship, and a slide washer having a plurality of wheel-side projections facing the wheel-side protruding segments. When the auger shaft encounters a torque exceeding a given value, the worm wheel and the boss member are enabled to rotate relative to one another. As the wheel-side projections ride on the protruding segments, the slide washer is moved in a direction opposed to the worm wheel. A washer detection switch detects such a movement to produce a detection signal to forcibly stop the operation of an engine.

4 Claims, 21 Drawing Sheets

OVERLOAD PROTECTING DEVICE FOR SNOW REMOVING MACHINE

BACKGROUND OF THE INVENTION

1. Field of the Invention

This invention relates to an overload protecting device in a snow removing machine, which has a simplified structure for protecting a power transmission path extending between a prime mover and an auger of the snow removing machine from encountering an overload.

2. Description of the Related Art

Various self-propelled snow removing machines have hitherto been proposed. A typical example of such machines is disclosed in Japanese Utility Model Publication No. SHO-51-34111.

The disclosed snow removing machine is comprised of an engine, a first pulley coupled to an output shaft of the engine, a belt stretched over between the first pulley and a second pulley, a rotating transmission shaft extending forwardly of the second pulley, a rotating auger shaft coupled to a forward end of the rotating transmission shaft via a gear case, and an auger mounted to the rotating auger shaft.

In the aforementioned snow removing machine, the auger is apt to bite a lump of ice or stone during a snow removing work to interrupt rotation of the auger, causing the power transmission path between the engine and the auger to encounter an overload. It is, therefore, desirable to remove such an overload state. However, employment of a complicated device or mechanism for removing the overload state undesirably results in an increase in the manufacturing cost.

SUMMARY OF THE INVENTION

It is therefore an object of the present invention to provide a structurally-simplified overload protecting device in a snow removing machine for preventing a power transmission path extending between a prime mover and an auger of the machine from encountering an overload.

According to an aspect of the present invention, there is provided an overload protecting device assembled in an auger transmission of a snow removing machine which comprises a worm wheel meshing with a worm formed on an input shaft of the auger transmission, a cylindrical member engaging with the worm wheel to be rotatable relative thereto and fixedly coupled to an auger shaft for non-rotational relationship, a disk located adjacent to the worm wheel for restricting a rotating angle of the cylindrical member and having a plurality of wheel-sided projections facing a plurality of wheel-sided protruded segments formed at a side wall of the worm wheel, detecting means for detecting movement of the disk toward a side thereof when the wheel-sided projections ride on the wheel sided protruded segments responsive to rotation of the worm wheel and the cylindrical member relative to one another, prime mover stopper means for forcibly stopping operation of a prime mover responsive to a signal delivered from the detecting means, and a resilient member urging the disk against the worm wheel, wherein a power transmission path between the prime mover and the auger shaft is prevented from encountering an overload.

With such a structure, when the auger shaft encounters a torque exceeding a given value, the worm wheel and the cylindrical member are enabled to rotate relative to one another, thereby allowing the wheel-side projections of the disk to ride on the wheel-side protruded segments of the worm wheel to cause the disk to be moved in a direction opposite from the worm wheel. Such movement of the disk is detected by the detecting means, thereby enabling the operation of the prime mover to be forcibly stopped in response to a signal produced by the detection means. Accordingly, by forming wheel-side protruding segments on the conventional worm wheel and by forming wheel-side projections on the disk while employing a commonly used switch as a detecting means and a relay as a prime mover stopper means to interrupt the ignition circuitry of the prime mover, it is possible for the power transmission path of the snow removing machine to be protected from encountering the overload in a simplified structure.

In a preferred form, the case of the auger transmission is provided with a case-side protruding element, while the disk is provided on a rear surface opposite from the surface formed with the wheel-side projecting element with a plurality of case-side projections to restrict rotation of the disk relative to the case by allowing the case-side projections to engage with the case-side protruding element. In this arrangement, when the rotation of the worm wheel is interrupted under a condition where the wheel-side projections ride on the wheel-side protruded segments, the auger, which is mounted to the auger shaft, is manually rotated in a clockwise direction, thereby causing the case-side projections of the disk to be brought into abutting engagement with the case-side protruding element of the case to stop rotation of the disk. When this occurs, the worm wheel is enabled to rotate to cause the wheel-side projections of the disk to slide across the wheel-side protruded segments. With such movement, the disk is enabled to restore its original position, releasing the detecting means to thereby allow the prime mover to be restarted up. Accordingly, it is possible for the overload protecting device to prevent an undesirable condition wherein the wheel-side projections of the disk remain in the riding condition over the wheel-side protruded segments in a simplified structure and in an easy fashion.

It is desirable that the aforementioned wheel-side projections and the case-side projections are oriented in a clockwise rotational direction of the auger shaft. That is, when assembling the disk, if the wheel-side projections and the case-side projections of the disk are oriented in the same rotational direction of the auger shaft during the snow removing work, it is possible to effectively prevent erroneous assembling of the disk and, further, by forming the wheel-side projections and the case-side projections in the same orientation, an easy fabricating step for the disk is obtained.

In a preferred form, the resilient member comprises a waved leaf spring made of an annular thin sheet formed by a waved-profile bending process. That is, the presence of the resilient member made of the waved leaf spring is effective for reducing a longitudinal space for receiving a spring to a smaller value than that required in, for example, a coil spring, thereby contributing to a miniaturization of the auger transmission.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
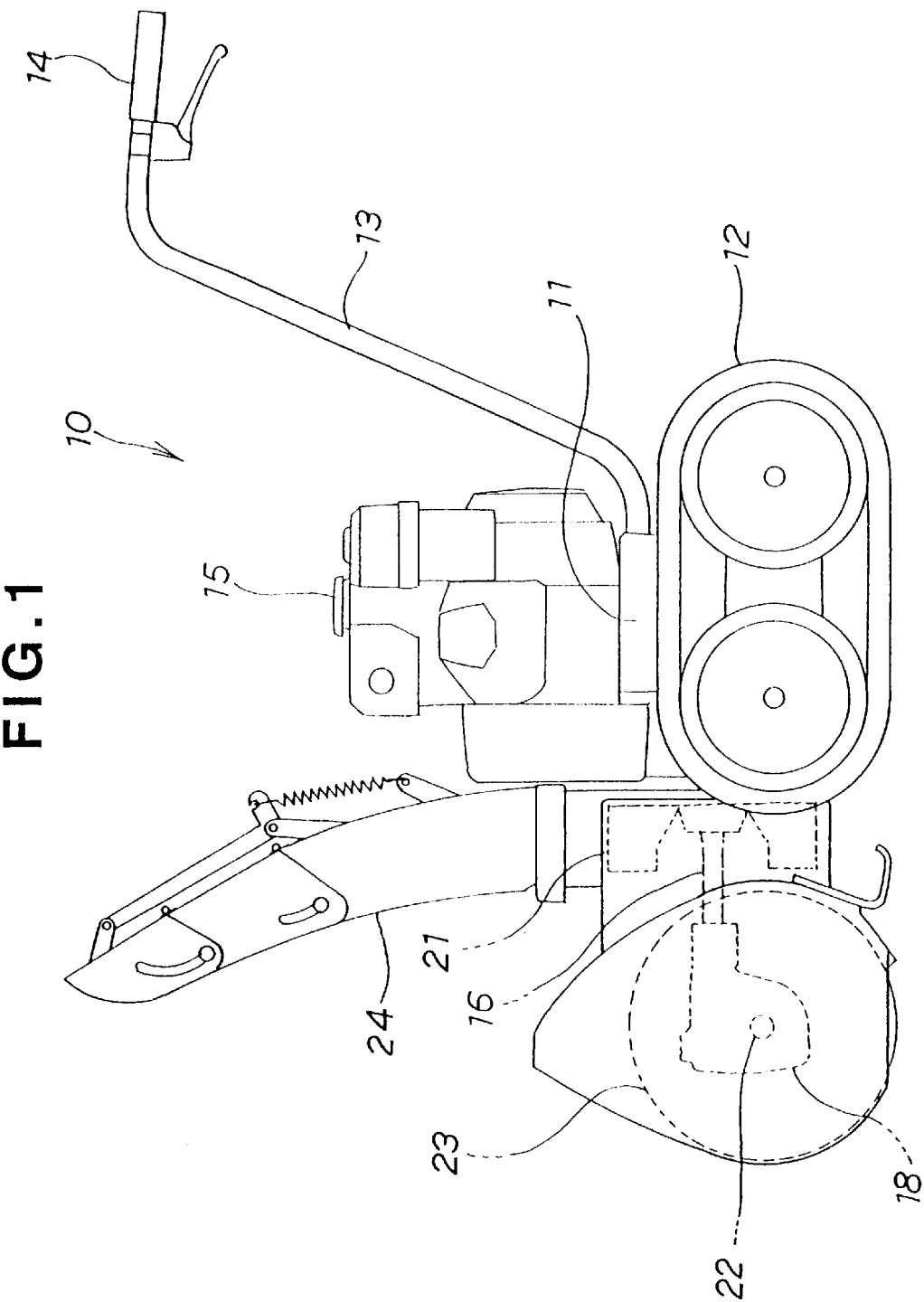
FIG. 1 is a side elevational view showing a snow removing machine equipped with an overload protecting device according to a first embodiment of the present invention.

Referring now to FIG. 1, a self-propelled snow removing machine 10 includes a body frame 11 mounted with a crawler 12. An operating handle 13, which enables manipulating and steering operations of the snow removing machine, extends obliquely and upwardly in a rearward direction from a rear distal end of the body frame 11. The operating handle 13 has two end portions which are bifurcated in leftward and rightward directions with respect to a traveling direction of the snow removing machine, with respective end portions having grips 14, 14. An engine 15, which serves as a prime mover, is mounted on the body frame 11. A drive shaft 16, which is connected to, and is driven by, the engine 15, extends in a forward direction. The drive shaft 16 is drivably connected to an auger transmission 18 which incorporates therein an over load protection device and is also drivably connected to a blower 21. An auger 23 is mounted on an auger shaft 22 of the auger transmission 18. The snow removing machine 10 operates such that the drive shaft 16 is driven with the engine 15 to rotate the blower 21 while rotating the auger 23, which is located forwardly of the blower 21, via the auger transmission 18 for thereby lifting up a collected amount of snow, gathered by the auger 23, and discharging it in a remotest location via the shooter 24.

The drive shaft 16 and the auger transmission 18 constitute a power transmission mechanism to allow power output produced by the engine 15 to be transmitted to the auger 23.

Now, the auger transmission 18, which forms an essential component part of the power transmission mechanism, is discussed in greater detail hereinbelow with respect to FIG. 2.

Figure 2:
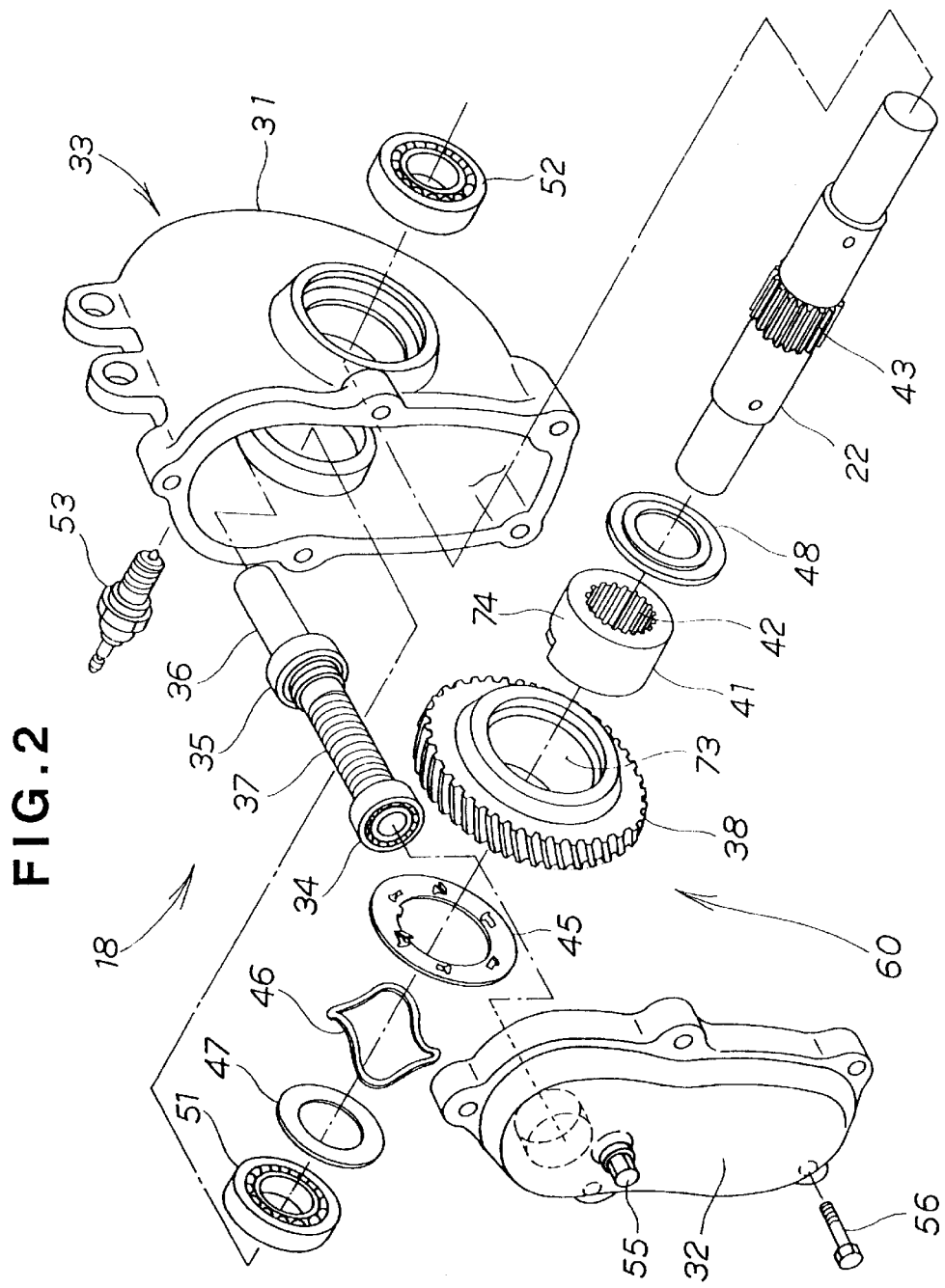
FIG. 2 is an enlarged, exploded perspective view showing an auger transmission incorporating the overload protecting device according to the first embodiment.

FIG. 2 is an exploded perspective view of the auger transmission incorporating the overload protecting device. The auger transmission 18 is constructed of a worm gear reduction unit. The auger transmission 18 includes a transmission case 33 constructed of a case body 31 and case cover 32. An input shaft 36, which is connected to the drive shaft 16 shown in FIG. 1, is rotatably supported with the transmission case 33 by means of bearings 34, 35, with the input shaft 36 being formed with a worm 37 which meshes with a worm wheel 38. An inner circumferential periphery of the worm wheel 38 is held in engagement with an outer periphery of a boss member 41 in the form of a cylindrical member. The boss segment 41 has an inner spline 42, and the auger shaft 22 has an outer spline 43, with the auger shaft 22 and the boss member 41 being coupled to one another through a spline connection. A disk-shaped slide washer 45 is located in close proximity to the worm wheel 38. A waved leaf spring 46, which serves as an urging member, urges the slide washer 45 toward the worm wheel 38. A first washer 47 is located at a position outward of the waved leaf spring 46. A second washer 48 is located at a position outward of the boss segment 41. The auger shaft 22 is rotatably supported with the case body 31 by means of bearings 51, 52. A washer detection switch 53 serves as a detecting means for detecting a sidewise movement of the slide washer 45. Reference numeral 55 designates a bolt which closes a pouring bore for allowing oil to be poured into the transmission case 33. The case body 31 and the case cover 32 are fixedly coupled to one another by means of a plurality of bolts 56 (with only one of which is shown in FIG. 2).

An important feature of the present invention concerns the overload protection mechanism 60, which is constructed of the worm wheel 38, the boss segment 41, the slide washer 45, the waved leaf spring 46, the first washer 47, the second washer 48 and the washer detection switch 53.

Figure 3:
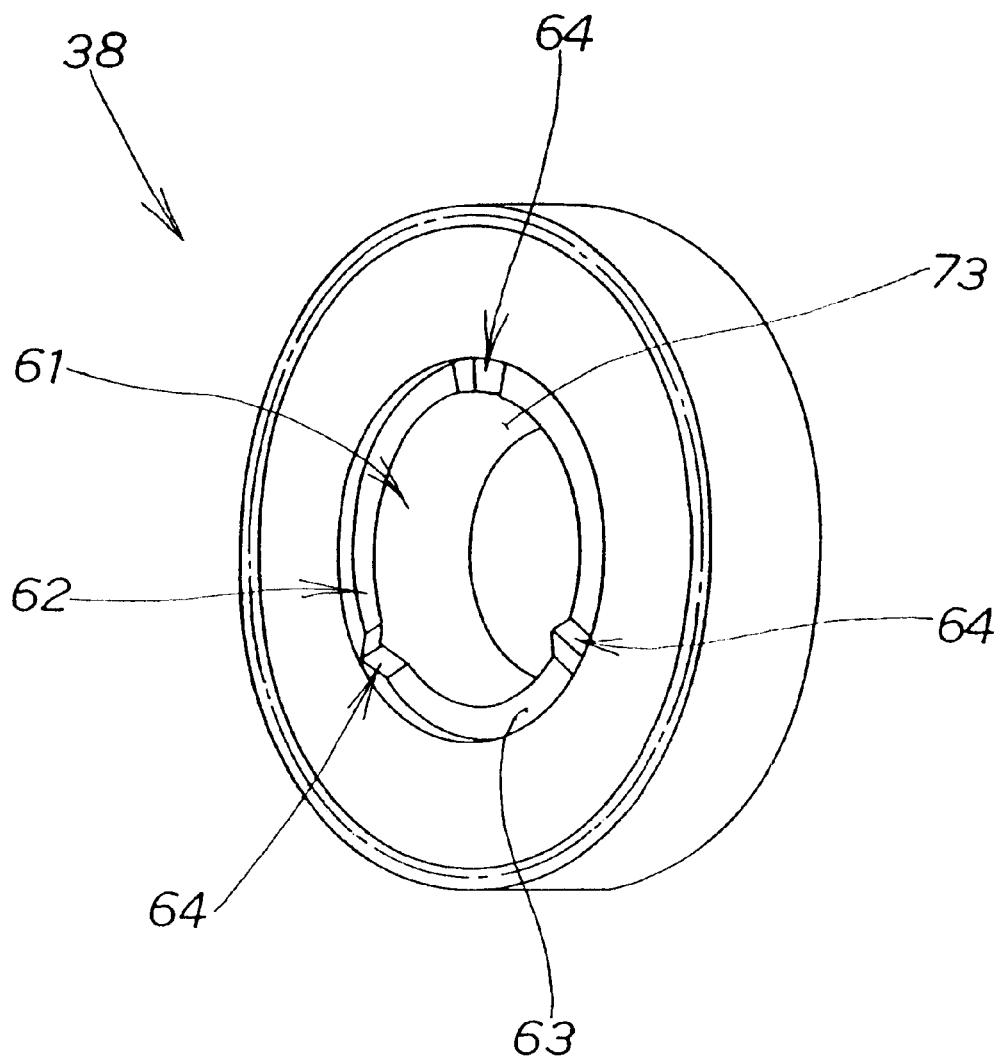
FIG. 3 is a perspective view showing a worm wheel of the overload protecting device shown in FIG. 2.

FIG. 3 shows, in enlarged and perspective view, the worm wheel 38 shown in FIG. 2. The worm wheel 38 has an engagement bore 61 with which the boss member 41, which is shown in FIG. 2, engages. One of the side walls of the worm wheel 38 is formed with an annular recess adjacent a circumferential periphery of the engagement bore 61. A bottom wall portion 63 of the annular recess 62 is formed with a plurality of circumferentially spaced, wheel-side protruding segments 64 in the form of V-shaped profile.

Figure 4:
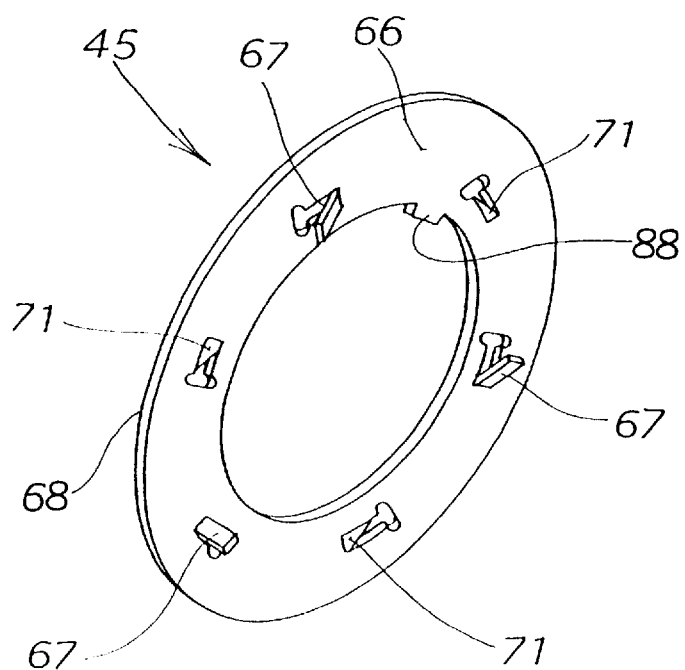
FIG. 4 is a perspective view showing a slide washer of the overload protecting device shown in FIG. 2.

FIG. 4 shows, in enlarged and perspective view, the slide washer 45. The slide washer 45 has one side 66 formed with a plurality of circumferentially spaced wheel-side projections 67, which extends toward the worm wheel 38 (see FIG. 3), and the other side 68 formed with a plurality of circumferentially spaced, case-side projections 71 which extends toward the case body 31. Respective edges of the wheel-side projections 67 and the case-side projections 71 are oriented in a clockwise rotational direction of the auger shaft 22 (see FIG. 1). An inner circumferential periphery of the slide washer 45 has an inwardly extending radial projection 88.

Figure 5A:
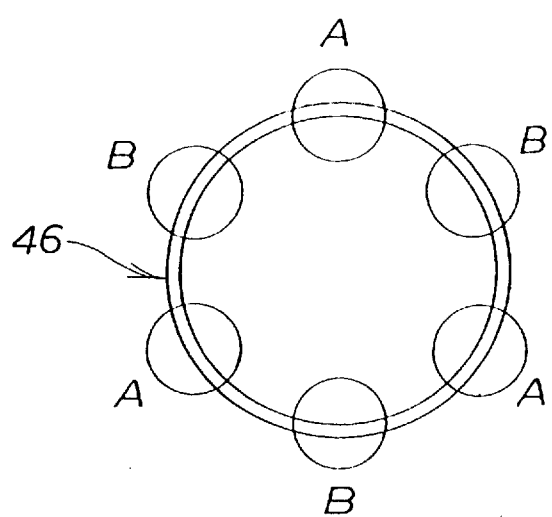
FIGS. 5A and 5B are schematic views respectively showing in front and side elevation a waved leaf spring of the overload protecting device shown in FIG. 2.
Figure 5B:
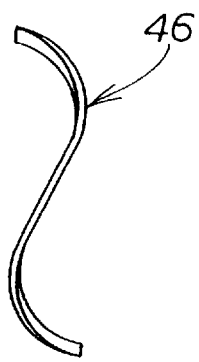

FIGS. 5A and 5B show the waved leaf spring 46 shown in FIG. 2. The waved leaf spring 46 is composed of an annular resilient body as viewed in FIG. 5A which is a front view of the same, and is made of a thin sheet formed in a wave-shaped profile by bending process as viewed in FIG. 5B which is a side view of the same. That is, the waved leaf spring 46 has a wave-shaped bent configuration which is bent along a circumferential direction such that the waved leaf spring 46 has bent areas A, which protrude in a front direction relative to the plane of the drawing, and bent areas B, which protrude in a rear direction relative to the plane of the drawing.

Figure 6:
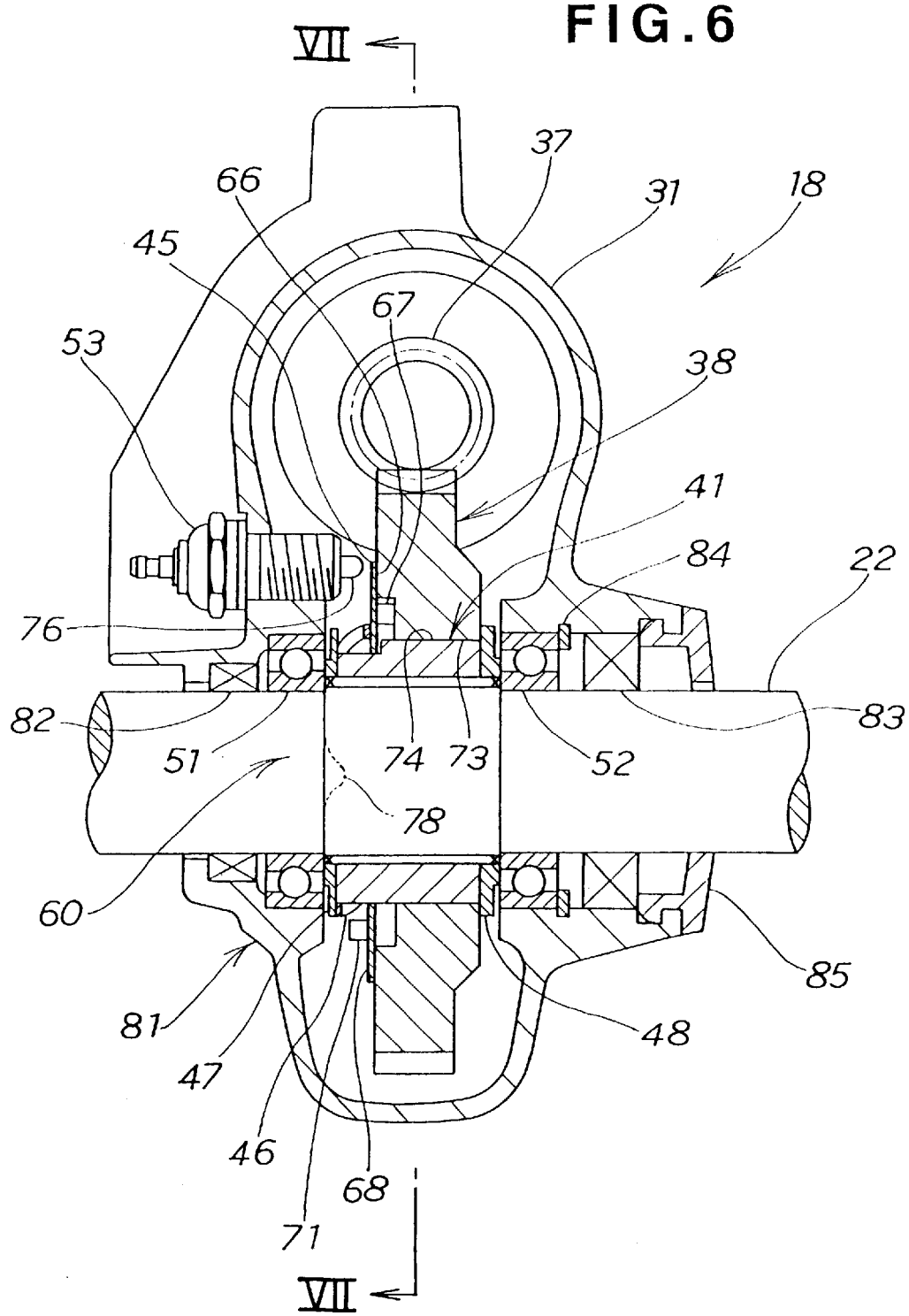
FIG. 6 is a cross sectional view showing the auger transmission equipped with the overload protecting device according to the first embodiment.
Figure 7:
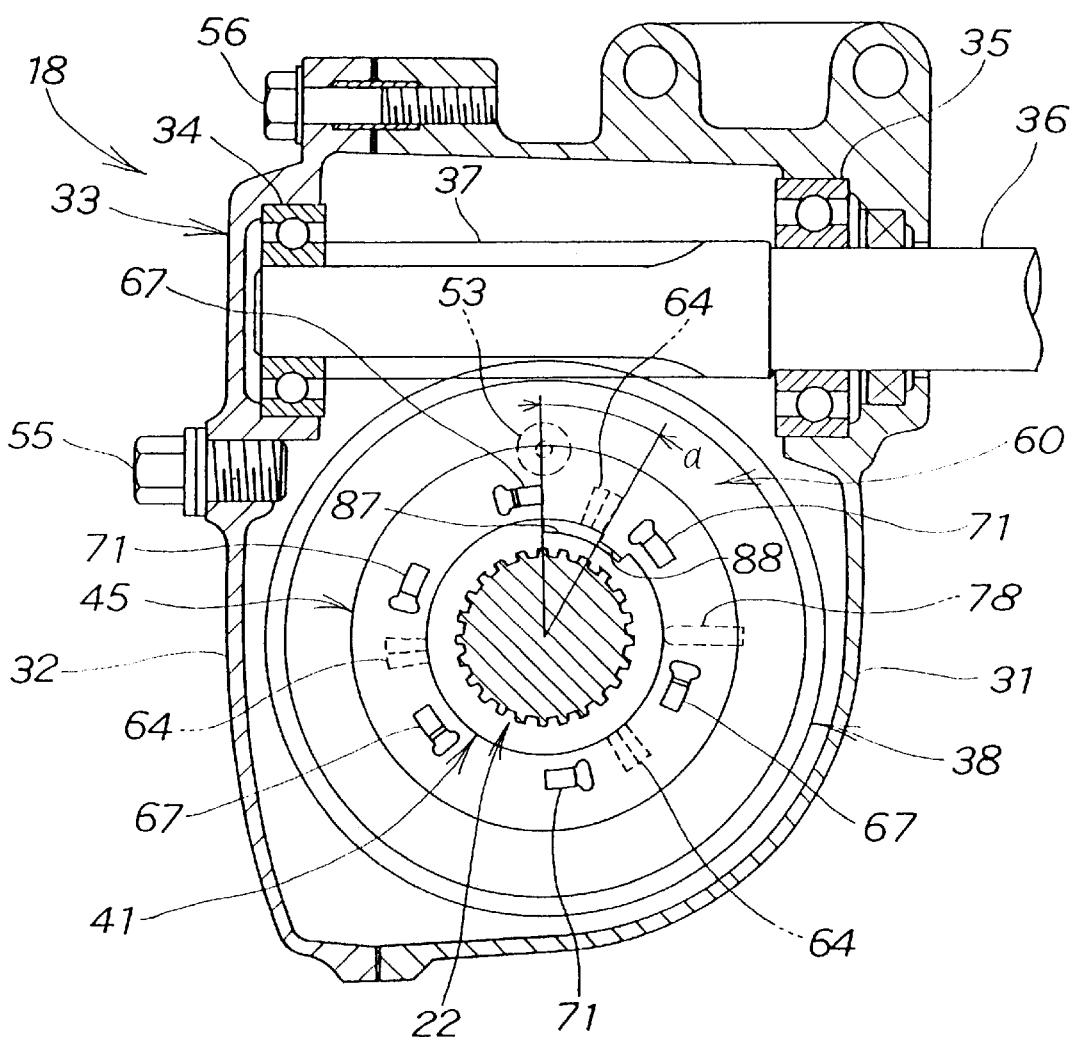
FIG. 7 is a cross sectional view taken along line VII—VII of FIG. 6.

FIGS. 6 and 7 show, in cross section, the auger transmission equipped with the overload protection device. In FIG. 6, press fitting the boss member 41 into the worm wheel 38 renders the worm wheel 38 to rotate with the boss member 41 as far as a normal torque is transmitted, but when the auger shaft 22 encounters a torque exceeding a given value (i.e., an overload condition), the boss member 41 and the worm wheel 38 are brought out of driving engagement to freely rotate relative to one another.

It is preferred that a sulphurizing treatment is applied to both a contact surface 73 and a contact surface 74 of the worm wheel 38 and the boss segment 41, respectively, which constitute the overload protection device 60.

The sulphurizing treatment is one of metal surface treatment processes which allow sulphuric free radicals to be dispersed in the surface layer of iron materials (such as carbon steel, cast iron, cast steel and stainless steel, etc.). Since the sulphuric free radicals provides an increased lubricating properties, it is highly effective to reduce the wear at the mutually facing contact surfaces of two components due to sliding friction thereof, resulting in an increased wear-resistance property.

The contact surface 73 of the worm wheel 38 and the contact surface 74 of the boss segment 41 may be treated not only with the sulphurizing process but also with a curburizing process or with a combination of the curburizing process and the sulphurizing process.

The waved leaf spring 46 is made of an annular thin sheet formed in a waved profile by a bending process and has an advanced feature, when compared with a coil spring etc, in that a space for receiving the spring is reduced to a minimum value to allow the auger transmission 18 to be constructed in a miniaturized size.

In order to receive a thrust load applied from the worm wheel 38 and the boss member 41, the second washer 48 has a greater thickness than the first washer 47.

The washer detection switch 53 is threaded to the case body 31 and has its inner distal end provided with a movable element 76 which detects the sidewise movement (i.e., the movement in a leftward direction as viewed in FIG. 6) of the slide washer 45. When the movable element 76 moves leftward in a stroke that exceeds a given distance, the washer detection switch 53 is turned on, thereby producing a detection signal.

Reference numeral 78 designates the case-side protruding element formed at a rear side of a bearing support section 81 of the case body 31 and constitutes a part of the overload protection device 60. Reference numerals 82, 83 designate oil seals, respectively, and reference numeral 85 designates a cap for the case body 31.

In FIG. 7, the boss member 41 has an outer periphery formed with a cutout 87. The cutout 87 receives the inwardly extending radial projection 88 of the slide washer 45, thereby restricting the rotational movement of the slide washer 45 within a rotational angle of α degrees. In FIG. 7, although the slide washer 45 is located at the rear side of the worm wheel 38, contours of the slide washer are traced in a solid line for convenience's sake.

As previously discussed above, an advanced feature of the illustrated embodiment concerns the slide washer 45 of which wheel-side projections 67 and the case-side projections 71 are oriented in the same clockwise-rotational direction of the auger shaft 22. As such, when mounting the slide washer 45, since the wheel-side projections 67 and the case-side projections 71 are oriented in the same rotational direction of the auger shaft 22, erroneous mounting work for the slide washer 45 is effectively avoided. Also, the presence of the wheel-side projections 67 and the case-side projections 71, both of which are oriented in the same direction, allows the slide washer 45 to be fabricated in an easy fashion.

Now, the operation of the overload protecting device 60 is described below with reference to FIG. 8 and FIGS. 9A to 9F.

Figure 8:
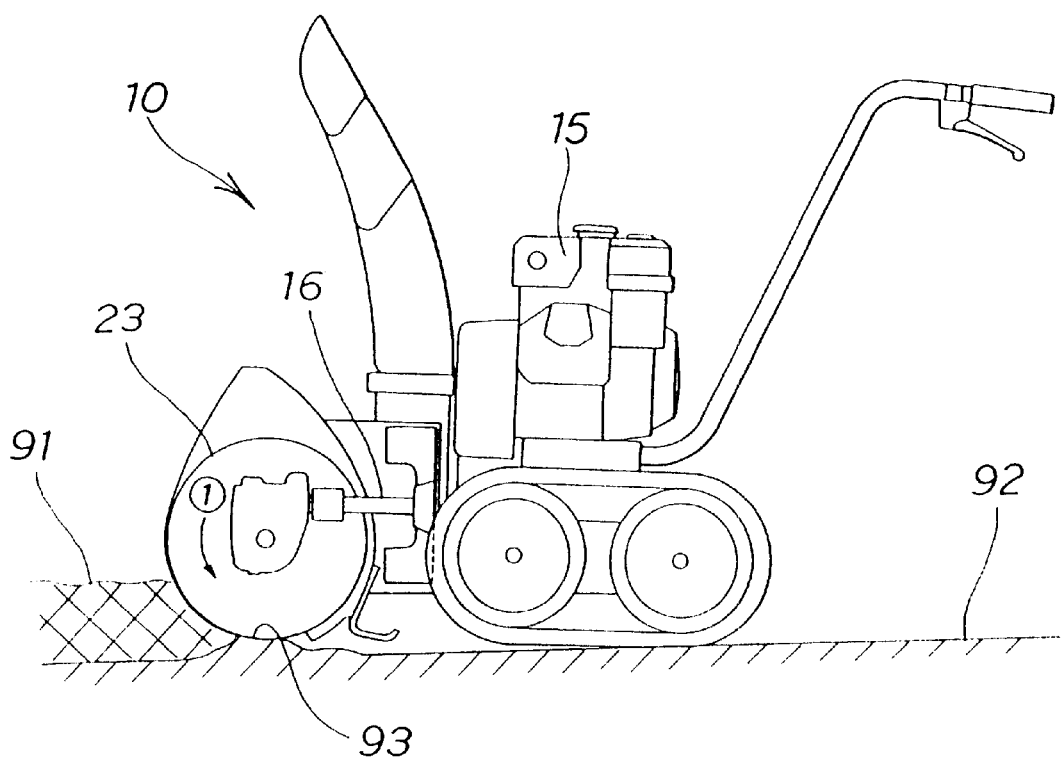
FIG. 8 is a side elevational view showing the snow removing machine experiencing a condition in which an auger bites a lump of ice or stone during a snow removing operation.

In FIG. 8, for example, during snow removing operation of the snow removing machine 10, if the auger 23 encounters a lump of ice or stone in snow 91 or encounters a spur portion 93 of a road surface 92, then the rotational movement of the auger 23 in a direction as shown by an arrow ①is disturbed, and the power transmission path between the auger 23 and the engine 15 via the drive shaft 16 is applied with an excessively large load.

In FIGS. 9A to 9F, respective views (a) indicate the relationship among the worm wheel 38, the boss member 41 and the slide washer 45, and, similarly, respective views (b) indicate, in enlarged cross sectional views taken on line b—b of respective views (a), the relationship among the case body 31, the washer detection switch 53, the slide washer 45 and the worm wheel 38.

Figure 9A:
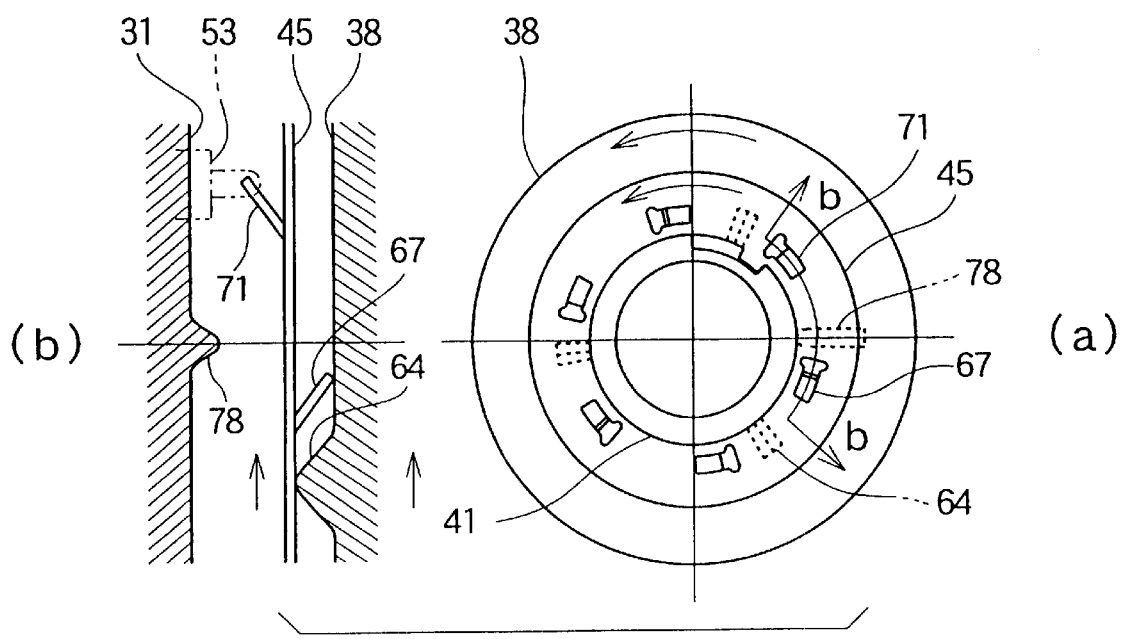
FIGS. 9A to 9F are views illustrating an operation of the overload protecting device according to the first embodiment, with (a) parts showing in side elevation a worm wheel, a boss member and a slide washer, and (b) parts being cross sectional views taken along lines b—b of the (a) parts.

For example, if the auger 23 ceases its rotation under a condition shown in FIG. 8, the boss member 41 is brought into a locked condition within the auger transmission as seen in FIG. 9A. When this occurs, since the engine of the snow removing machine continues its operation, the power output of the engine is transmitted to the worm wheel 38 via the drive shaft and the input shaft of the auger transmission, causing the worm wheel 38 to begin its rotation relative to the boss member 41 which remains in the locked condition. That is, as shown in FIG. 9A(a), the worm wheel 38 is rotated counterclockwise as shown by an arrow, and as seen in the view (b), the worm wheel 38 is shifted upward as shown by an arrow. In this instance, the slide washer 45 also rotates in the same direction as the worm wheel 38.

Figure 9B:
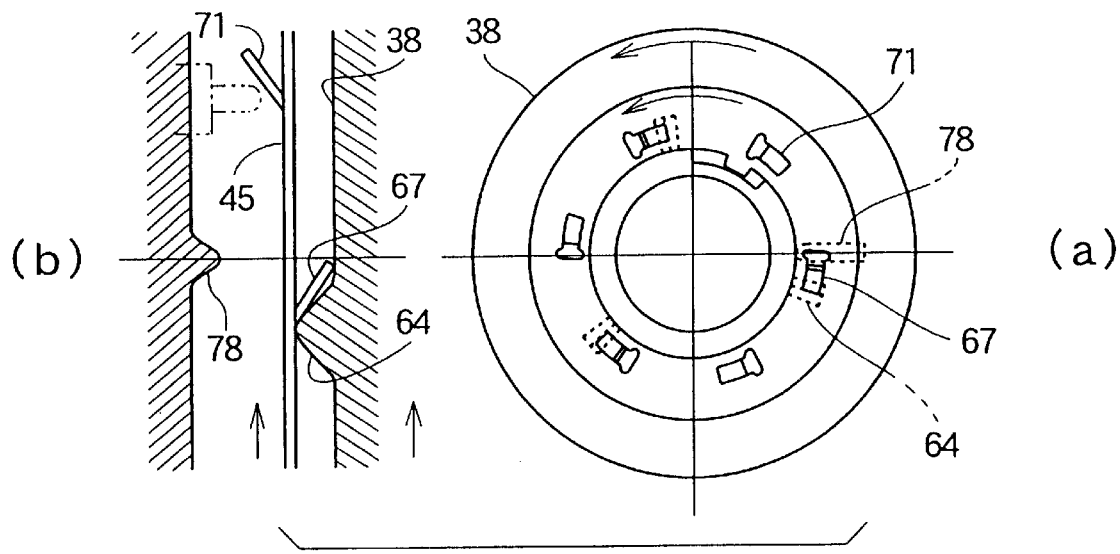

In FIG. 9B, the wheel-side protruding segments 64 of the worm wheel 38 is brought into engagement with the side face of the wheel-side projection 67 of the slide washer 45.

Figure 9C:
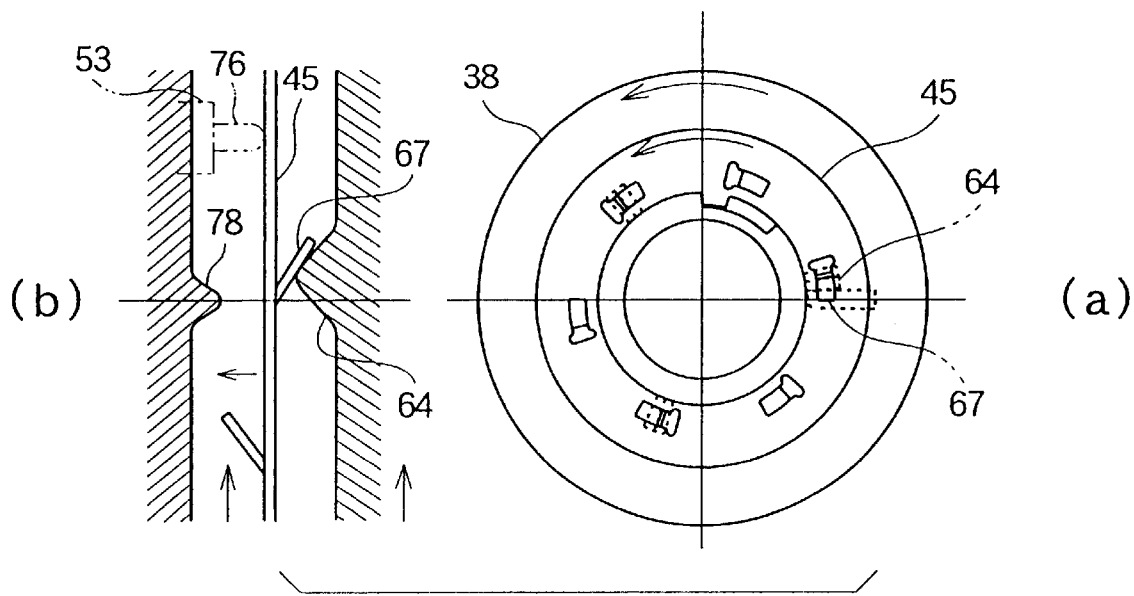

In FIG. 9C, as the worm wheel 38 further rotates, the wheel-sided projection 67 begin to ride on the wheel-side protruding segments 64, and the slide washer 45 commences to move toward the side thereof (i.e., in a direction wherein the auger shaft 22 extends), i.e., in a leftward direction in the drawing. As a result, the slide washer 45 is brought into abutting engagement with the movable element 76 of the washer detection switch 53.

Figure 9D:
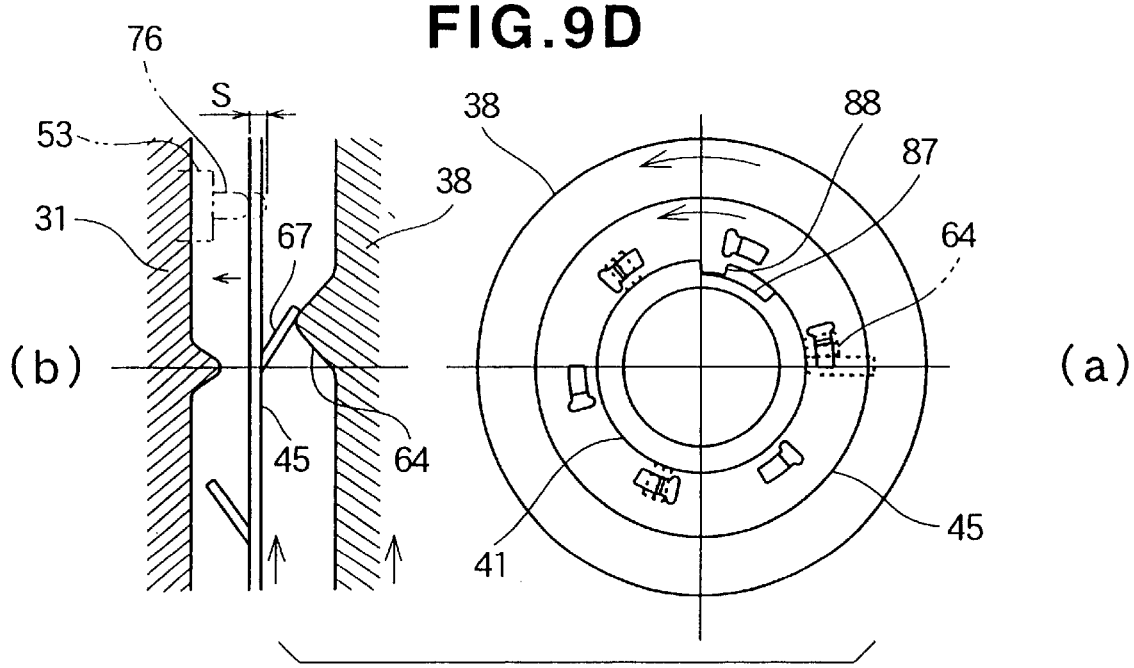

In FIG. 9D, as the worm wheel 38 still further rotates, the wheel-side projection 67 is caused to ride on the wheel-side protruding segments 64 to an extent nearly equal to the maximum height of the wheel-side projection 67. When this occurs, since the inwardly extending radial projection 88 of the slide washer 45 is brought into abutting engagement with the end wall of the cutout 87 of the boss segment 41, the rotation of the slide washer 45 is interrupted. As the amount of riding degree of the wheel-side projection 67 relative to the wheel side protruding segments 64 increases, the slide washer 45 is further shifted toward the side thereof. As a consequence, since the movable element 67 of the washer detection switch 53 moves for a stroke equal to a distance S from a condition shown in FIG. 9C, the washer detection switch 53 is turned on in such a stroke. Thus, the engine 15 is turned off.

Here, assuming that the engine is stopped under a condition where the wheel-side projection 67 of the slide washer 45 rides on the wheel-side protruding segments 64 of the worm wheel 38, the washer detection switch 53 remains in its turned-off state, with a resultant difficulty encountered in start-up of the engine. To avoid this inconvenience, it is required for the coupled condition between the wheel-side projection 67 of the slide washer 45 and the wheel-side protruding segments of the worm wheel 38 from being released. An operating process for releasing such a coupling state is described below in detail.

Figure 9E:
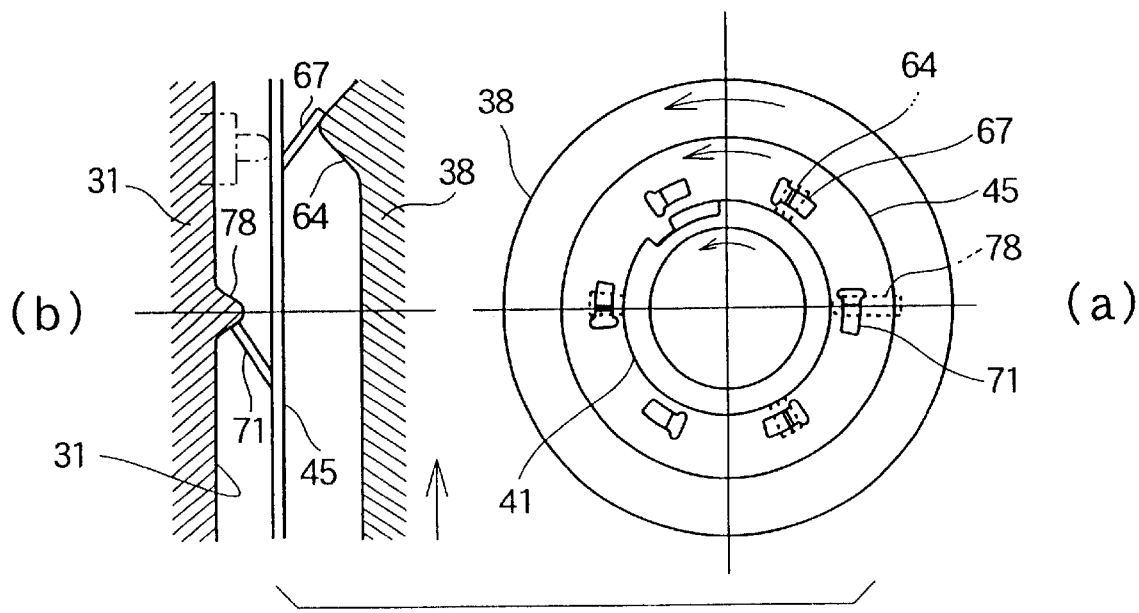

Under a condition shown in FIG. 9D, the auger is manually rotated in the clockwise direction followed by a unitary rotation of the boss member 41, the slide washer 45 and the worm wheel 38 via the auger shaft as shown in FIG. 9E until the case-sided projection 71 of the slide washer 45 is brought into abutting engagement with the case-sided projection 78 of the case body 31.

Figure 9F:
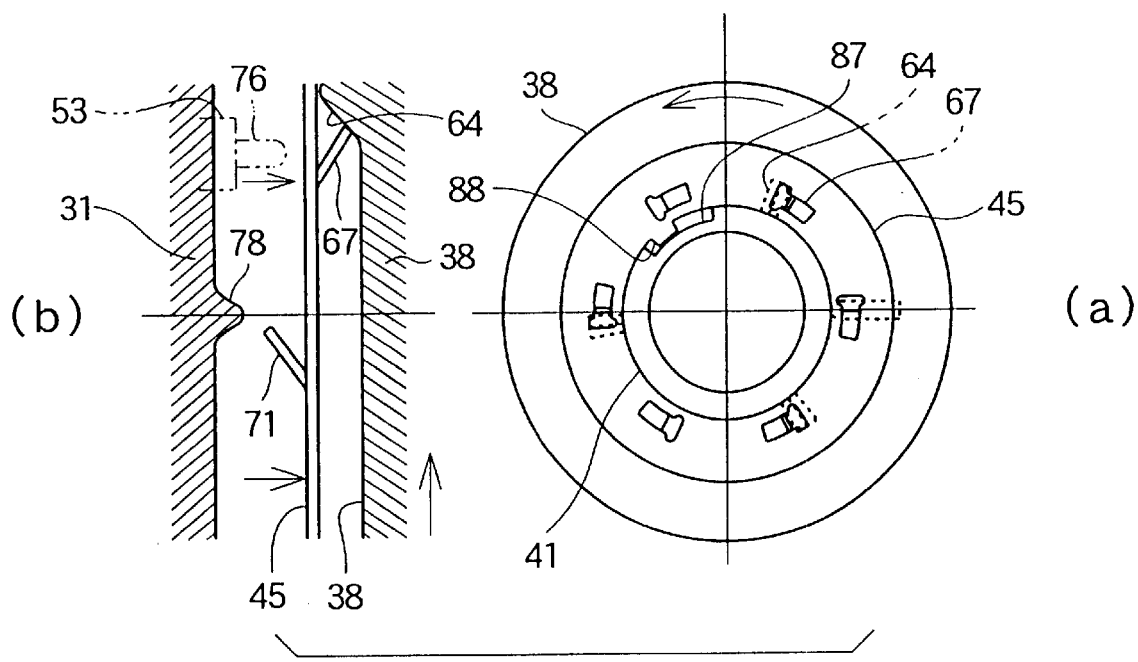

In FIG. 9F, as the auger further rotates, since a gap exists between an end portion (rightward portion) of the cutout 87 of the boss member 41 and the inwardly extending radial projection 88 of the slide washer 45, the boss segment 41 and the worm wheel 38 are enabled to rotate in a unitary fashion while keeping the rotation of the slide washer 45 in an interrupted state, thereby allowing the wheel-side projection 67 of the slide washer 45 to ride across the wheel-side protruding segments 64 of the worm wheel 38. This results in movement of the slide washer 45 toward the side thereof, i.e., rightward as shown by an arrow due to resilient force of the waved leaf spring, thereby allowing the movable element 76 of the washer detection switch 53 to return to its original state for turning off the washer detection switch 53. That is, the wheel-side projection 67 is released from the wheel-side protruding segments 64, enabling the re-start up of the engine.

As described above with respect to FIGS. 6 and 7 and FIGS. 9A to 9F, an advanced feature of the present invention concerns the case-side protruding element 78 formed on the transmission case 33 of the auger transmission 18, with the rear wall (the other surface) 68 of the slide washer 45 with its front wall 66 formed with the wheel-side projection 67 being held in abutting engagement with the case-side protruding element 78 for restricting the rotational movement of the slide washer 45 relative to the transmission case 33.

It will thus be appreciated from the foregoing description that by manually rotating the auger 23 (see FIG. 1), which is mounted to the auger shaft 22, in the clockwise direction when the rotation of the worm wheel 38 is interrupted under the condition where the wheel-side projection 67 of the slide washer 45 rides over the wheel-side protruding segments 64, the case-side projection 71 of the slide washer 45 is brought into abutting engagement with the case-side protruding element 78 of the transmission case 33 to interrupt the rotation of the slid washer 45, while rotating the worm wheel 38 to allow the wheel-side projection 67 of the slide washer 45 to pass across the wheel-side protruding segments 64. With such an arrangement, the slide washer 45 is shifted toward the side thereof to its original location, thereby enabling the washer detection switch 53 from being released from a detective position to restart the operation of the engine 15 (see FIG. 1). Accordingly, it is possible for the wheel-side projection 67 of the slide washer 45 to be prevented from remaining in the running-on state over the wheel-side protruding segments 64 with a simplified structure in an easy manner.

Figure 10:
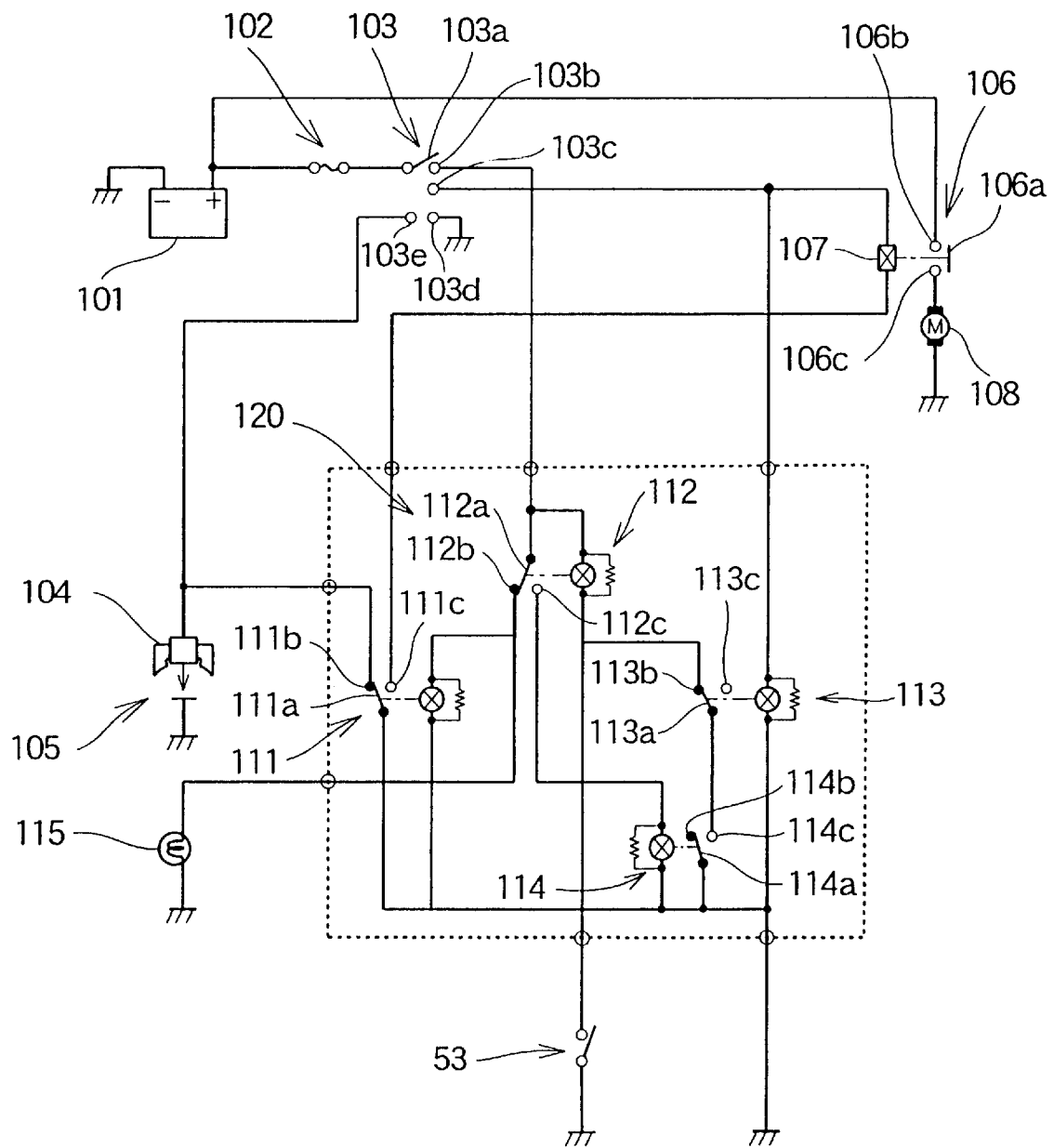
FIG. 10 is an electric circuit diagram illustrating an engine stopper means for the overload protecting device according to the first embodiment.

FIG. 10 is an electric circuit diagram for the overload protecting mechanism of the first preferred embodiment discussed above and serving as means for interrupting the operation of the engine.

In FIG. 10, the electric circuit includes a battery 101, a fuse 102, a main switch 103, an ignition coil 104, an ignition plug 105, a starter switch 106, a solenoid 107 for turning on or turning off the starter switch 106, a starter motor 108, relays 111 to 114 and an indicator lamp 115.

The main switch 103 includes a movable contact 103a, and four stationary contacts 103b, 103c, 103d, 103e.

The ignition coil 104 functions to generate high voltage power output responsive to power output generated by an alternator (not shown) due to cranking operation of the engine. Upon receiving the high voltage generated by the ignition coil 104, the ignition plug 105 produces an electrical spark.

The starter switch 106 includes a movable contact 106a, and two stationary contacts 106b, 106c.

The relay 111 includes a movable contact 111a, and two stationary contacts 111b, 111c. The relay 112 includes a movable contact 112a, and two stationary contacts 112b, 112c. The relay 113 includes a movable contact 113a, and two stationary contacts 113b, 113c. The relay 114 includes a movable contact 114a, and two stationary contacts 114b, 114c.

The relays 111, 112 constitute an engine stopper means 120 which serves as a prime mover stopper means which forcibly interrupts the operation of the engine during its operation when the washer detection switch 53 is turned on. The engine stopper means 120 forms a part of the overload protecting mechanism 60 (see FIG. 6).

Now, the operation of the engine stopper means 120 is described below in detail with respect to FIGS. 11 to 13.

Figure 11:
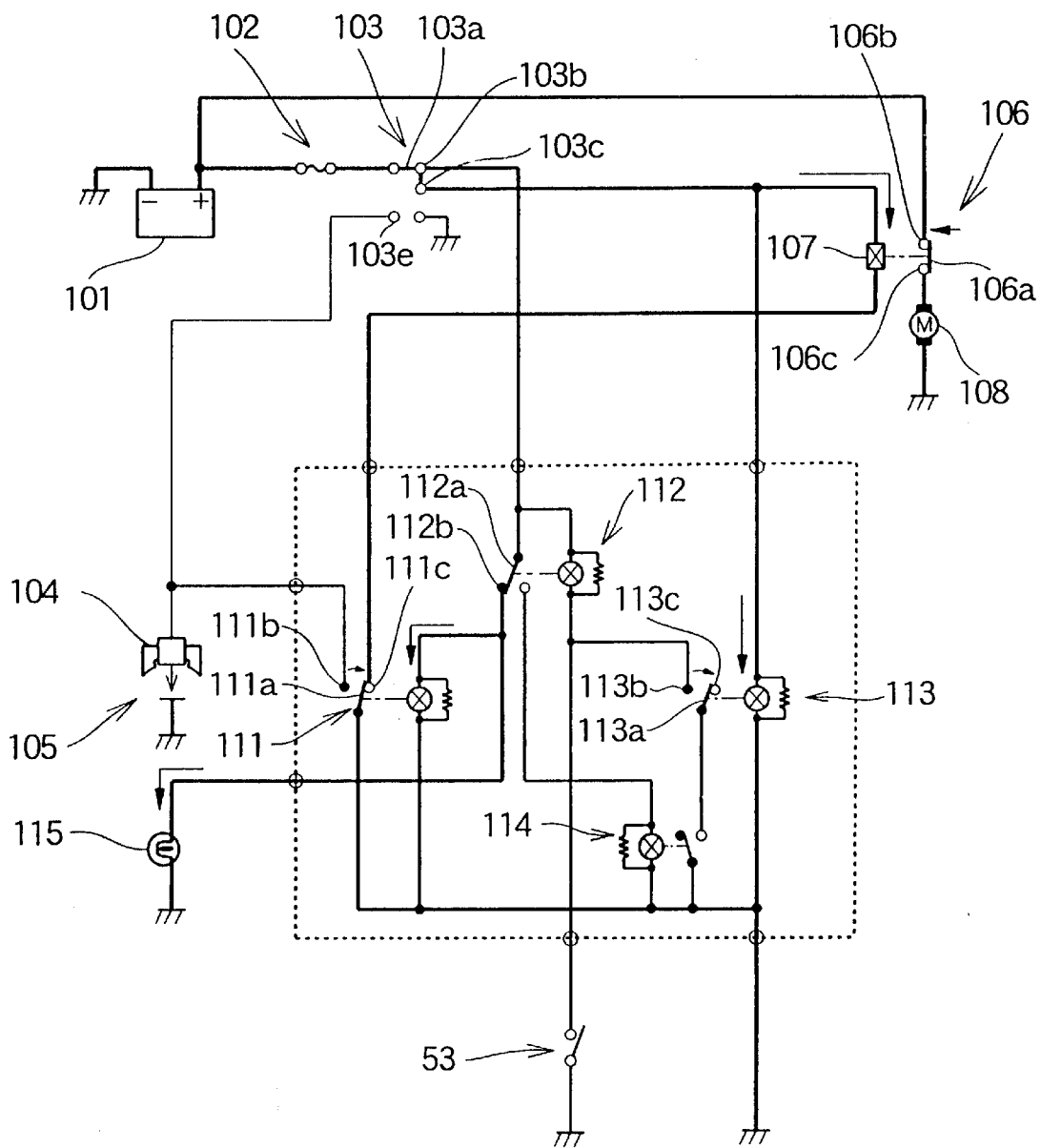
FIG. 11 is an electric circuit diagram illustrating a conductive state for an engine start-up operation in the circuit diagram shown in FIG. 10.

In FIG. 11, the main switch 103 is first turned on to start up the engine. Upon turning on of the main switch 103, the movable contact 103a is connected to the stationary contacts 103b, 103c, thereby energizing the relay 113. Upon actuation of the relay 113, the connection of the movable contact 113a is changed over from the stationary contact 113b to the stationary contact 113c.

Further, since the movable contact 112a of the relay 112 is connected to the stationary contact 112b, electric current flows through the indicator lamp 115 which is consequently turned on. Concurrently, the relay 111 is energized to allow the connection of the movable contact 111a, which has been connected to the stationary contact 111b as shown in FIG. 11, to be changed over to and to be connected to the stationary contact 111c. When this occurs, the solenoid 103 is energized, and the movable contact 111a of the starter switch 106 renders the connection between the stationary contact 106b and the stationary contact 106c to rotate the starter motor 108 by which the engine is cranked and started up.

Figure 12:
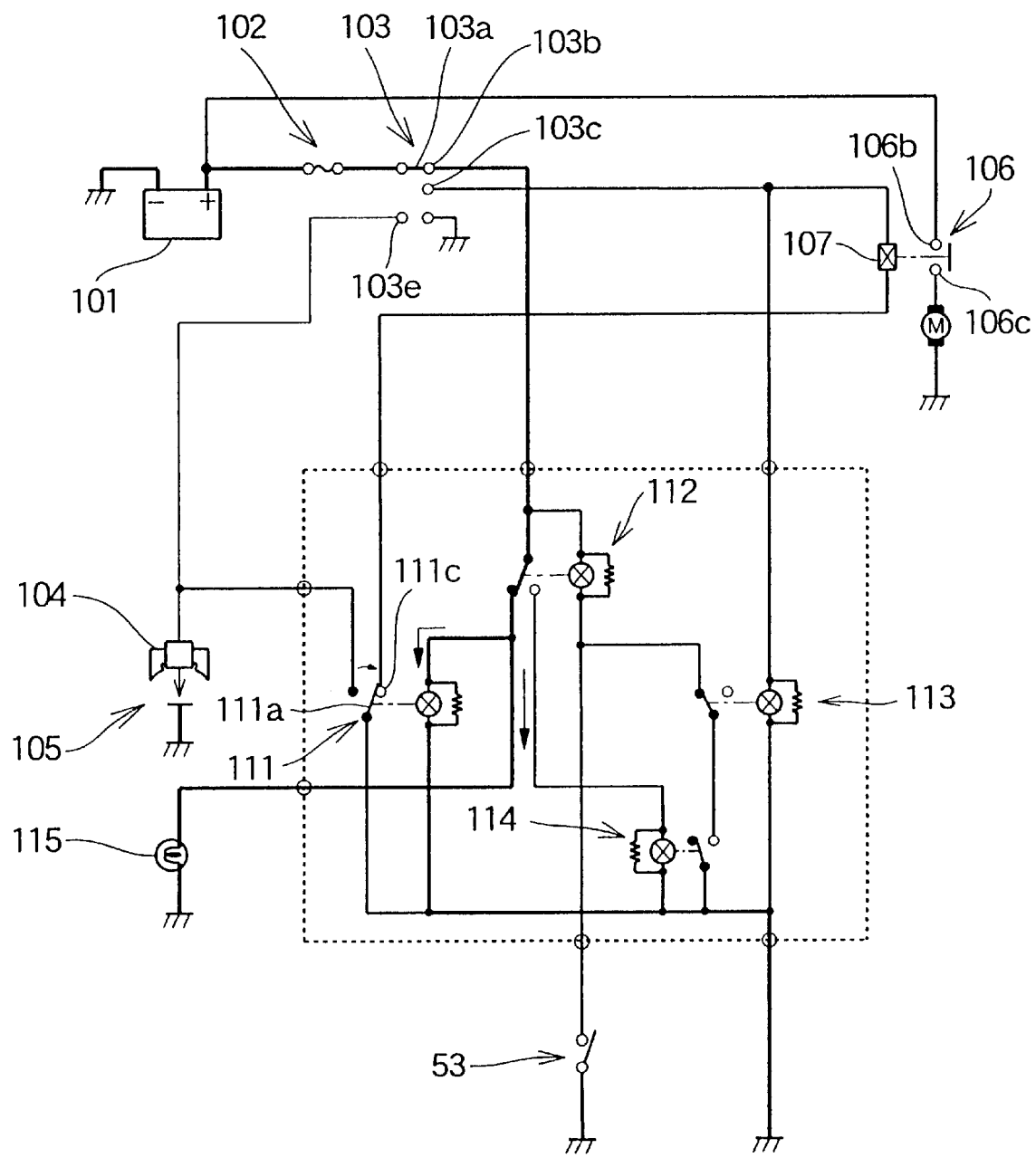
FIG. 12 is an electric circuit diagram illustrating a conductive state during the engine operation in the circuit diagram shown in FIG. 10.

In FIG. 12, after the start up of the engine, the movable switch 103a of the main switch 103 restore its original position to interrupt the connection with respect to the stationary contact 103c while maintaining the connection with only the stationary contact 103b. Consequently, the supply of power output to the solenoid 107 from the battery 101 is interrupted to allow the solenoid 107 to restore its original state such that the connection between the stationary contacts 106b, 106c of the starter switch 106 is interrupted to maintain the operation of the engine under a condition where the starter motor 108 is turned off.

During the operation of the engine, since the movable contact 103a of the main switch 103 is connected to the stationary contact 103b, electric current flows through the indicator lamp 115 via the relay 112, turning on the indicator lamp 115. At the same time, since the relay 111 is turned on, the movable contact 111a is held in electrical connection with the stationary contact 111a.

To stop the engine, the main switch 103 may be simply turned off. However, this may leave a flywheel in continued rotation by inertia, thereby causing the ignition plug 105 to produce an electric spark by electric power generated by a generator. Thus, as the main switch 103 is turned off, the ignition plug 105 is grounded by connecting the stationary contact 103d with the stationary contact 103e to prevent electric current from flowing to the ignition plug to thereby stop the engine instantly.

Figure 13:
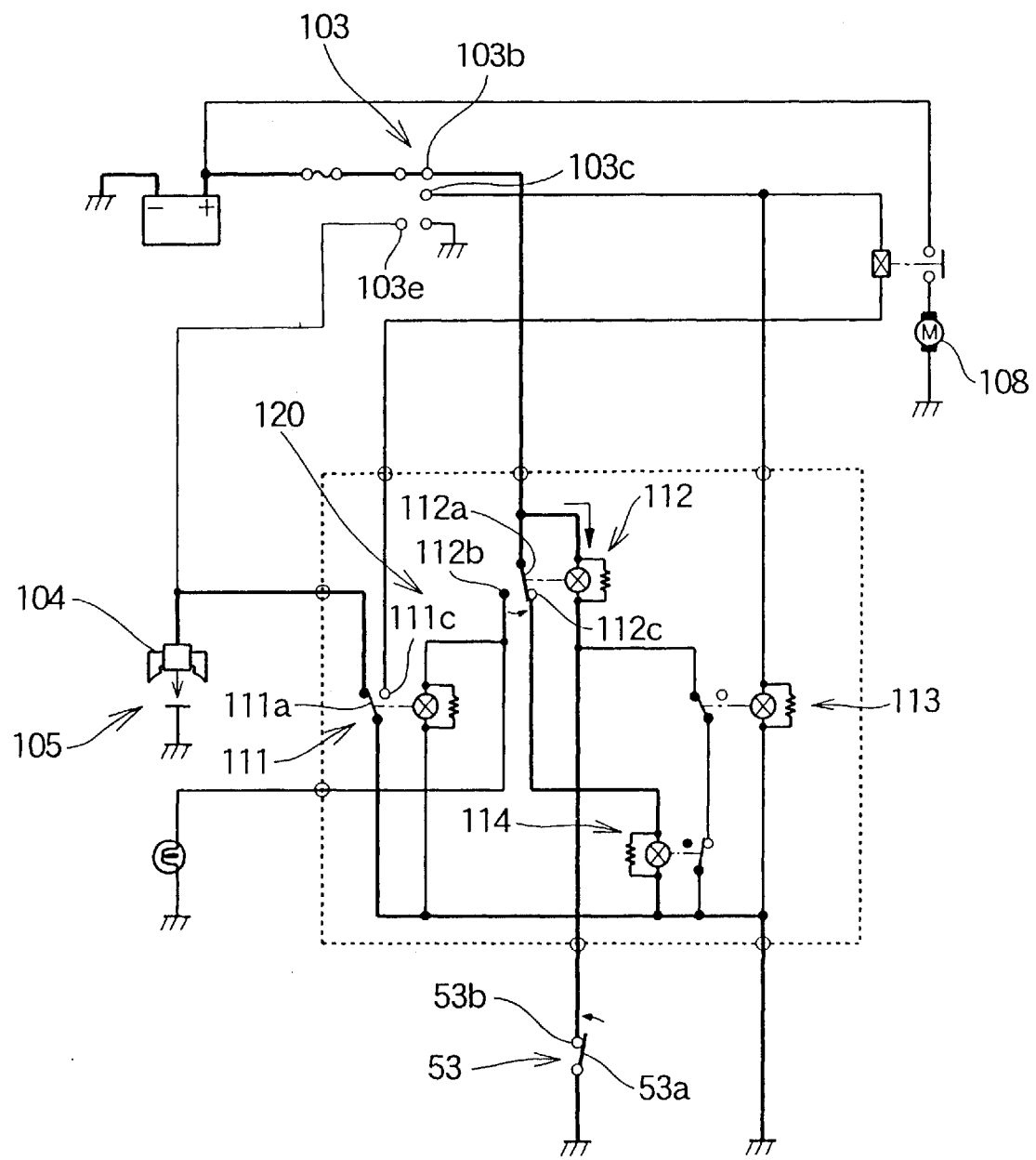
FIG. 13 is an electric circuit diagram illustrating a conductive state under a condition where a washer detection switch is turned on in the circuit diagram shown in FIG. 12.

If, during the operation of the engine, the washer detection switch 53 is turned on in a manner as previously discussed above with respect to FIG. 9D, i.e., when the movable contact 53a of the washer detection switch 53 is connected to the stationary contact 53b as shown in FIG. 13, then the relay 112 is actuated as shown by an arrow, thereby allowing the movable contact 112a to be connected to the stationary contact 112c to turn on the relay 114. Concurrently, the movable contact 112a of the relay 112 is released from the stationary contact 112b, thereby allowing the relay 111 to restore its original state to cause its movable contact 111a to be connected to the stationary contact 111b. When this occurs, since the primary coil of the ignition coil 104 is connected to the ground via the relay 111 and has a low voltage potential, resulting in the turned-off state of the ignition plug 105 to stop the engine operation. Such a stop in the engine operation is carried out with the engine stopper means 120 composed of the relays 111, 112.

That is, when the relay 112 is turned on whereas the relay 111 is turned off under the condition where washer detection switch 53 is turned on, the ignition plug 105 is turned off to forcibly stop the engine operation. Under this condition, even if the starter motor 108 is attempted to be turned on by connecting the movable contact 103a of the main switch 103 to the stationary contact 103c, the starter motor 108 is not started up because the movable contact 111a of the relay 111 is not connected to the stationary contact 111c.

Figure 14:
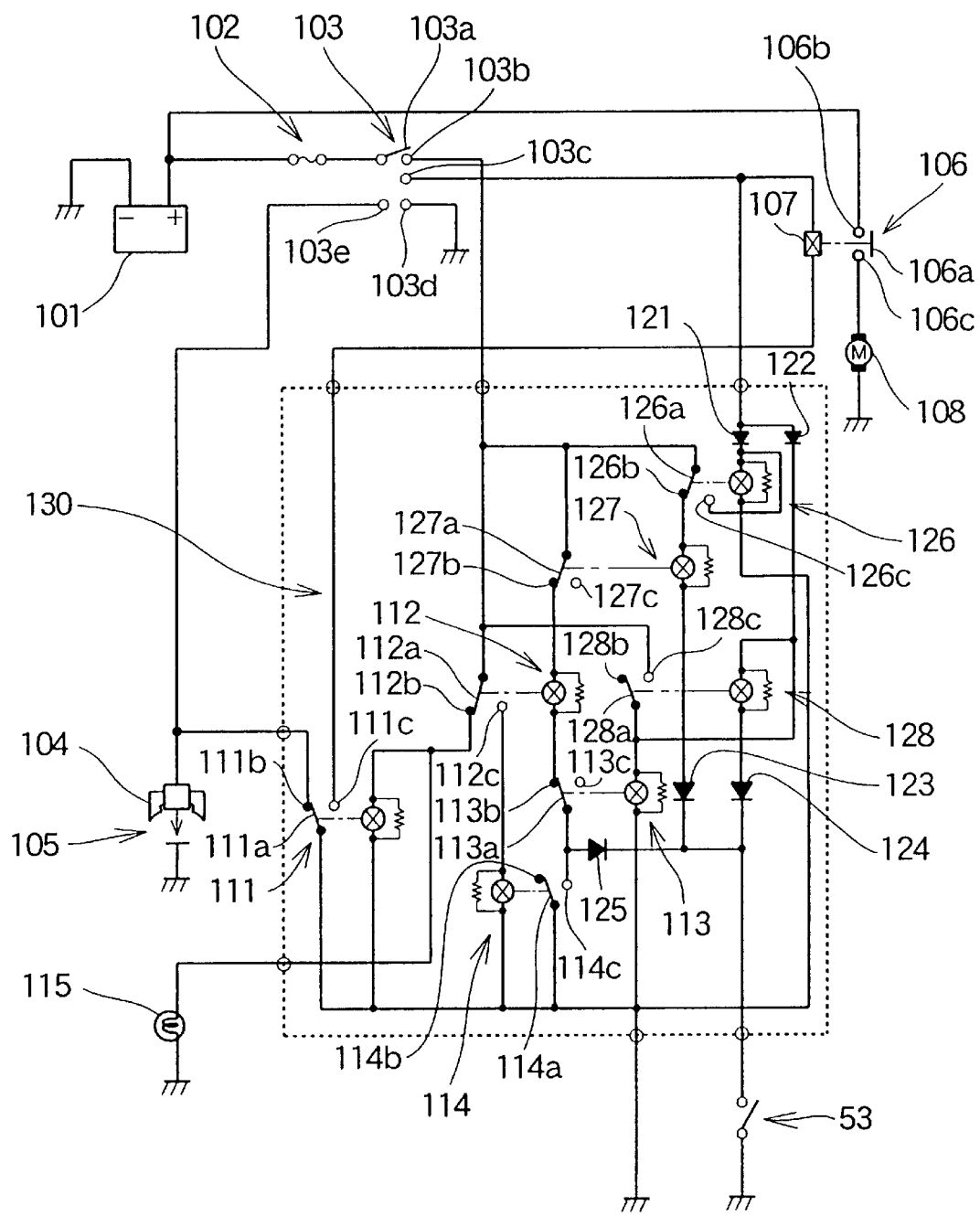
FIG. 14 is an electric circuit diagram illustrating an operation of an engine stopper means for the overload protecting device according to a second embodiment of the present invention.

FIG. 14 is a circuit diagram for illustrating the engine stopper means for the overload protecting device of a second preferred embodiment according to the present invention, with like component parts bearing the same reference numerals as those used with respect the first preferred embodiment shown in FIG. 10 and a detailed description of the same being herein omitted for the sake of simplicity. In FIG. 14, reference numerals 121, 122, 123, 124, 125 designate a diode, respectively. Reference numerals 126, 127, 128 designate a relay, respectively.

The relay 126 to 128 have respective movable contacts 126a to 128a, and respective stationary contacts 126b, 126c, 127b, 127c, 128b, 128c.

The relays 111, 112, 126 form an engine stopper means 130 which serves as a prime mover stopper means for forcibly stopping the engine during its operation when the washer detection switch 53 is turned on. The engine stopper means 130 forms part of the overload protecting device 60 (see FIG. 6). That is, the overload protecting device 60 is constructed of the worm wheel 38, the boss segment 41, the slide washer 45, the waved leaf spring 46, the first washer 47, the second washer 48, the washer detection switch 53, the case-sided projection 78 and the engine stopper means 130.

Now, the operation of the engine stopper means 130 of the second preferred embodiment is described in detail with reference to FIGS. 15 to 17.

Figure 15:
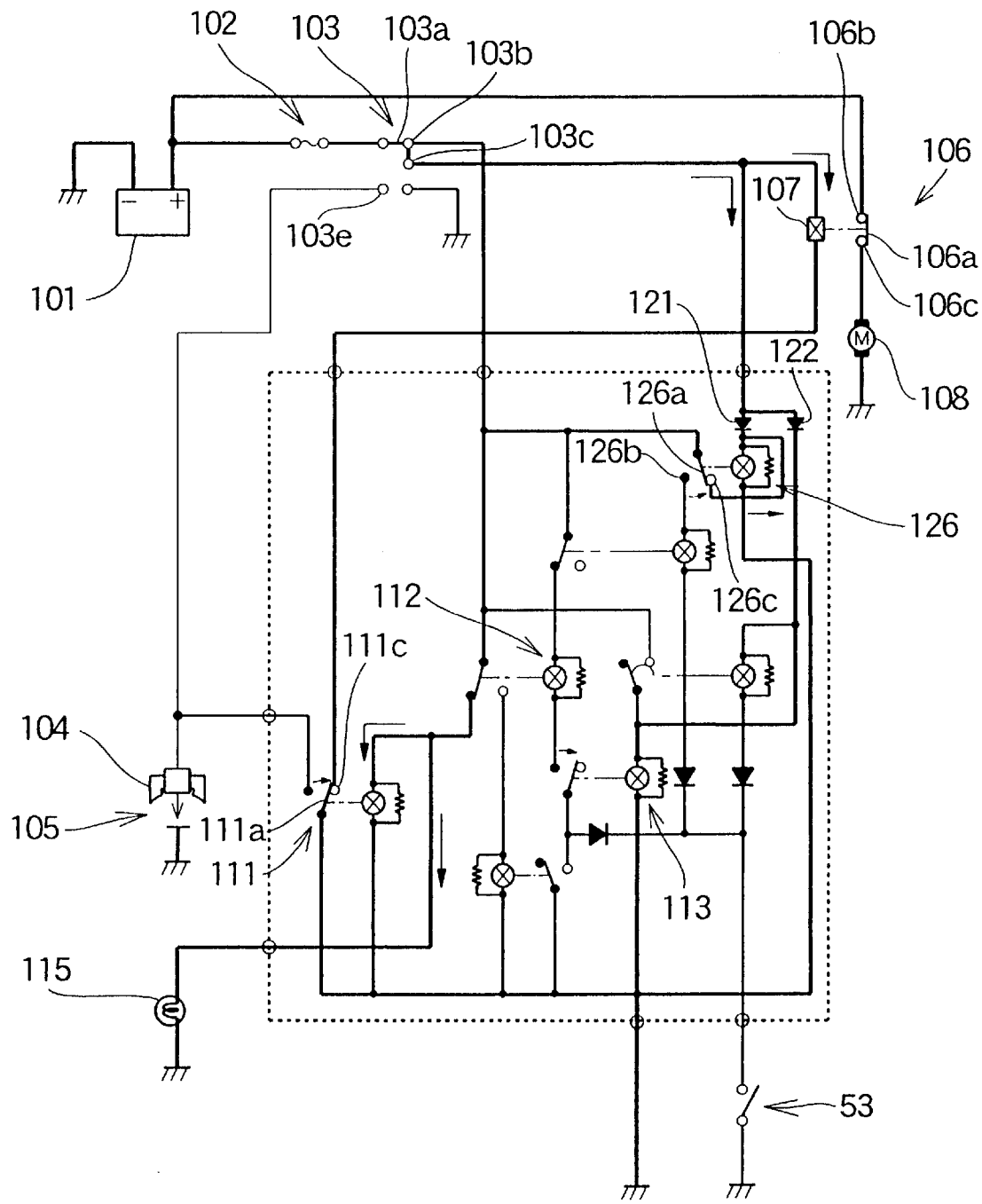
FIG. 15 is an electric circuit diagram illustrating a conductive state during the start-up operation of the engine in the circuit diagram shown in FIG. 14.
Figure 16:
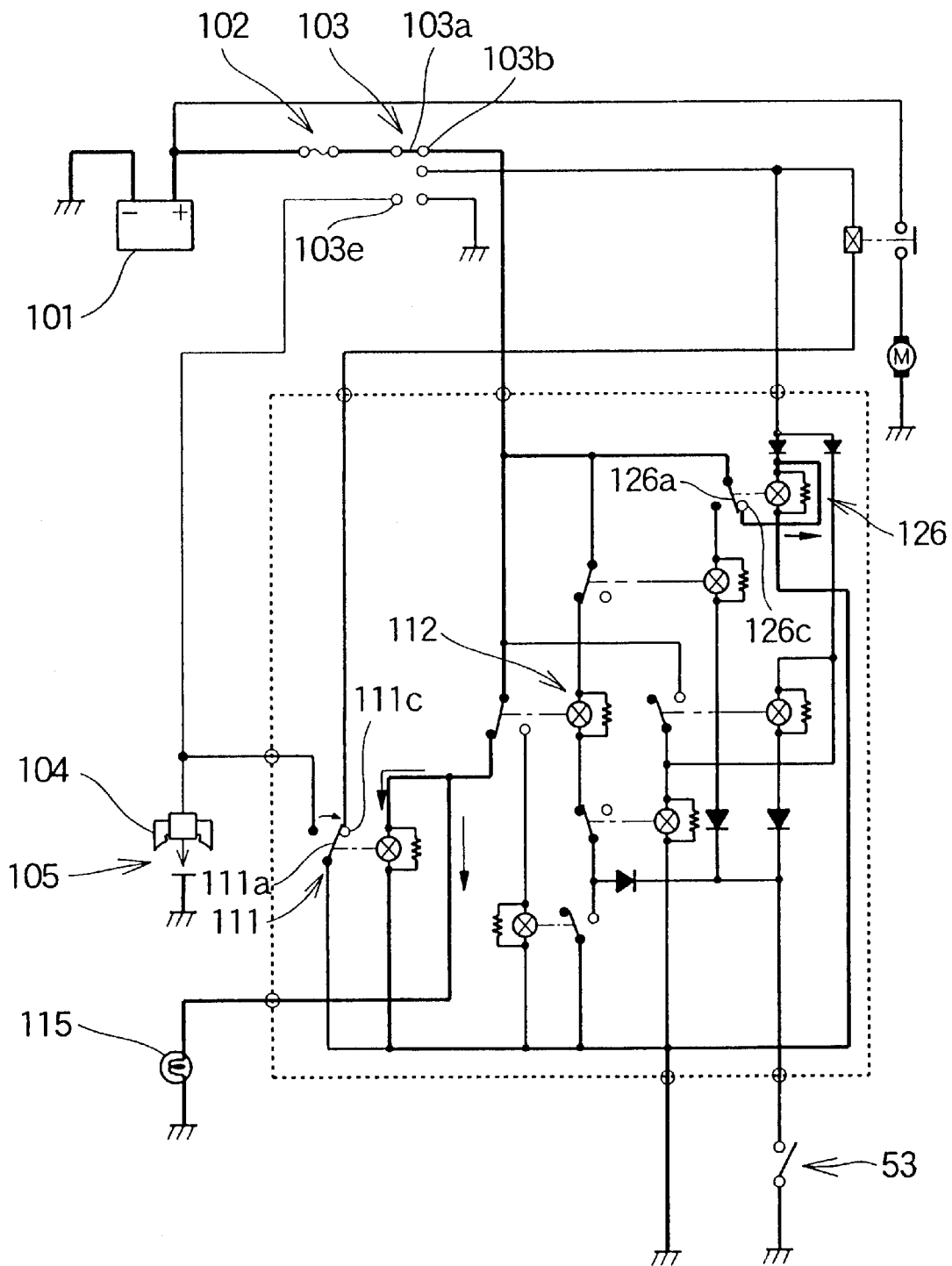
FIG. 16 is a circuit diagram illustrating a conductive state during the operation of the engine in the circuit diagram shown in FIG. 14.

In FIG. 15, in order to start up the engine, the main switch 103 is turned on, thereby connecting the movable contact 103a to the stationary contacts 103b, 103c. When this takes place, electric current flows from the battery 101 to the relay 126 via the fuse 102, the main switch 103 and the diode 121. Then, electric current flows through the relay 112 to the indicator lamp 115 which in turn is lighted on. Concurrently, the relay 111 is actuated to allow its movable contact 111a to be connected to the stationary contact 111c to allow electric current to flow through the solenoid 107. When this occurs, the movable contact 106a of the starter switch 106 is connected to the stationary contacts 106b, 106c to rotate the starter motor 108, rendering the engine to be cranked to cause the ignition plug 105 to produce the ignition spark for starting up the engine.

Figure 17:
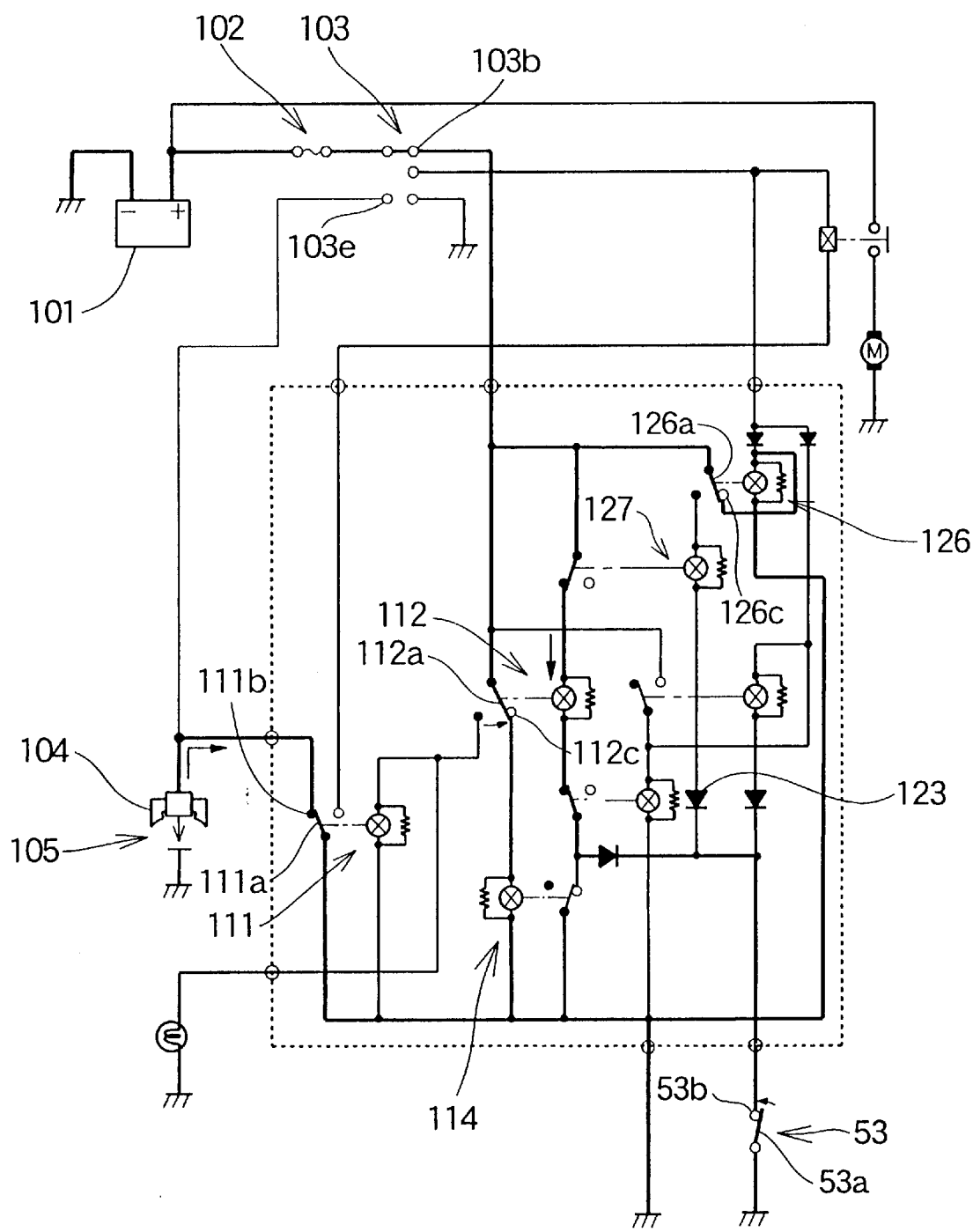
FIG. 17 is an electric circuit diagram illustrating a conductive state under a condition where the washer detection switch is turned on in FIG. 16.

FIG. 17 is a circuit diagram which is used during the operation of the engine.

During operation of the engine, since the movable contact 103a of the main switch 103 is connected to the stationary contact 103b, electric current flows through the relay 112 to the indicator lamp 115 as shown by an arrow. When this occurs, the relay 111 is actuated such that the movable contact 111a is connected to the stationary contact 111c and is maintained in such a connected state.

During start-up of the engine as described above with reference to FIG. 15, electric current flows through the stationary contact 103b of the main switch 103, the movable contact 126a and the stationary contact 126c to the relay 126 as shown by an arrow, and such an electrical connection is maintained during the operation of the engine. Thus, during the operation of the engine, the movable contact 126a is held in electrical connection with the stationary contact 126c. That is, the relay 126 enters its self-retained state.

As previously discussed with respect to FIG. 9D, if the washer detection switch 53 is turned on during the operation of the engine, i.e., when the movable contact 53a of the washer detection switch 53 is connected to the stationary contact 53b as viewed in FIG. 17, the relay 112 is actuated as shown by an arrow because the relay 126 remains in its self-retained state, causing the movable contact 112a to be connected to the stationary contact 112c.

When this occurs, the relay 111 restores its original position such that the movable contact 111a is connected to the stationary contact 111b, thereby causing the primary coil of the ignition coil 104 to remain at the low voltage potential to prevent the ignition plug 105 from producing the ignition spark to stop the engine.

Under the condition where the washer detection switch 53 is turned on, in the first preferred embodiment shown in FIG. 13, even if the main switch 103 is actuated in its starter start-up position, i.e., even if the movable contact is connected to the stationary contact 103c, the starter motor 108 is not turned on. In the second preferred embodiment, it is to be noted that even when the washer detection switch 53 remains in the turned-on state, the starter motor 108 is enabled to be started up. Thus, the auger can be manually rotated in a manner as discussed above with respect to FIGS. 9E and 9F, and after start-up of the engine the auger automatically begins to rotate.

For example, when the washer detection switch 53 is turned on to flow electric current in a direction as shown by an arrow indicated by a phantom line, the movable contact 112a of the relay 112 is connected to the stationary contact 112c. When this occurs, the movable contact 111a of the relay 111 is maintained in electrical connection with the stationary contact 111b, and the engine operation is stopped while turning off the indicator lamp 115. Under this condition, even if the movable contact of the main switch 103 is connected to the stationary contact 103c with a view to starting up the engine, the starter motor 108 is not turned on, and the ignition plug 105 does not produce the electrical spark.

Figure 18:
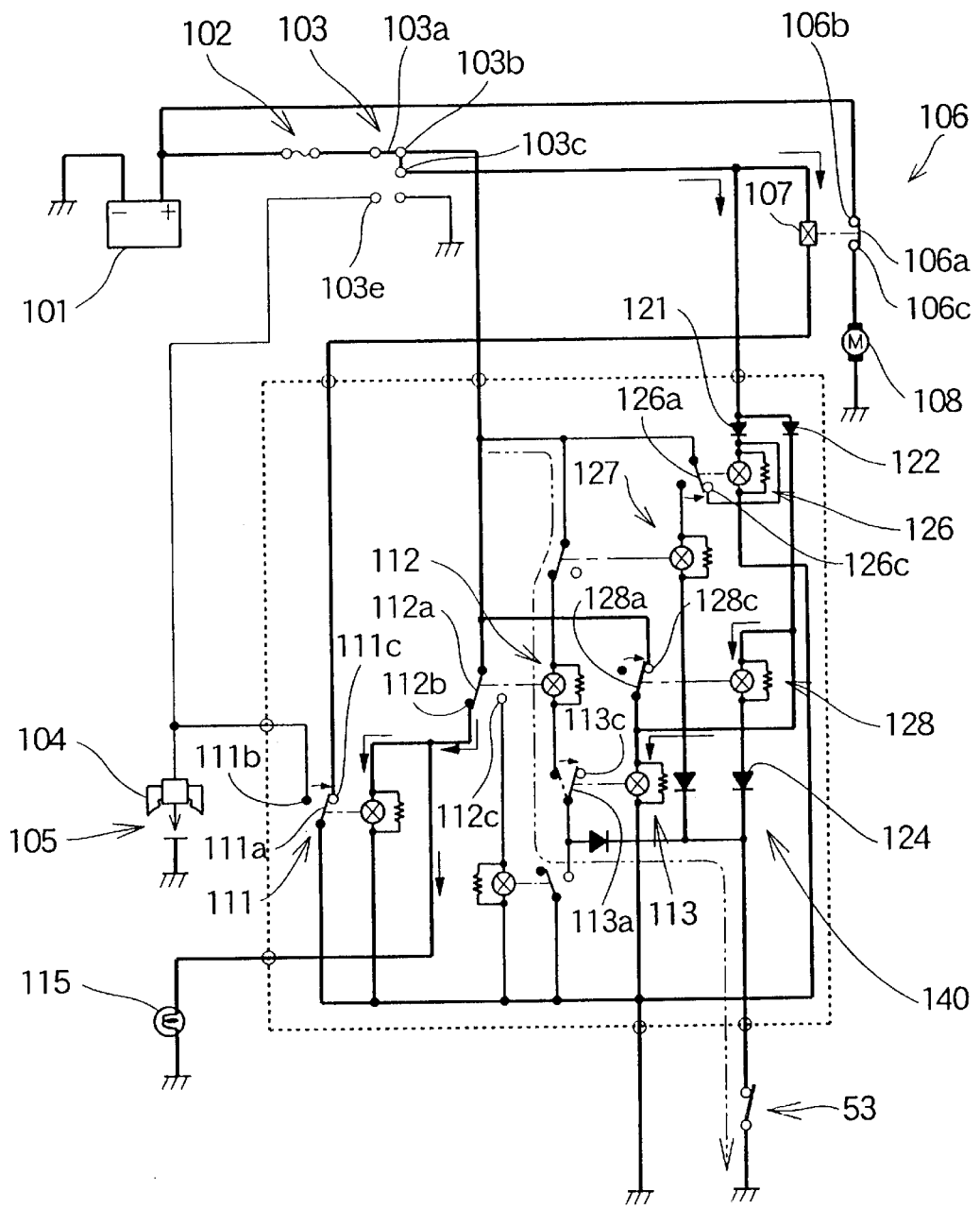
FIG. 18 is an electric circuit diagram illustrating a conductive state under a condition where a starter motor is started up from an engine stop's state.

In contrast, in the second preferred embodiment, if the movable contact 103a of the main switch 103 is actuated from the state shown in FIG. 17 and is connected to the stationary contact 103c as shown in FIG. 18, the relay 126 remains in its self-retained state, and the relay 128 is turned on via the diode 122 such that the movable contact 128a is connected to the stationary contact 128c. Then, the relay 113 is turned on and the movable contact 113a is connected to the stationary contact 113c. When this occurs, the relay 112 restores its original state, and the movable contact 112a is connected to the stationary contact 112b, allowing electric current to flow through the indicator lamp 115 which in turn is lighted on. Concurrently, the relay 111 is turned on, and the movable contact 111a is connected to the stationary contact 111c.

Thus, electric current flows through the solenoid 107, thereby allowing the movable contact 106a of the starter switch 106 to be connected to the stationary contacts 106b, 106c. When this occurs, the starter motor 108 is started up, thereby cranking the engine to cause the ignition plug 105 to produce the ignition spark for starting up the engine.

The aforementioned relays 113, 128 constitute a starter restart-up means 140.

That is, when the relays 128, 113 are turned on, the movable contact 112a of the relay 112 is connected to the stationary contact 112b, thereby energizing the relay 111 such that the movable contact 111a is connected to the stationary contact 111c to cause the ignition plug 105 to produce the ignition spark.

When connecting the movable contact 103a of the main switch 103 to the stationary contact 103c under the condition where the washer detection switch 53 is turned on, the relay 128 remains in its self-retained state (i.e., the movable contact 128a is held in electrical connection with the stationary contact 12 8c), thereby playing a role to disenable the circuit for stopping the engine. When the washer detection switch 53 is turned off to release the self-retained condition of the relay 128, the engine stopper circuit is enabled to function such that when the washer detection switch 53 is turned on, the engine is enabled to be stopped in operation.

In the second illustrated embodiment, the presence of the starter restart-up means 140 enables the starter motor 108 to start up the engine even when the washer detection switch 53 is turned on. In the first preferred embodiment, it is hardly to restart up the engine when the washer detection switch 53 is turned on, and, as discussed above with respect to FIG. 9F, it is required to take a motion to turn off the washer detection switch 53 by manually releasing the state wherein the wheel-sided projection 67 of the slide washer 45 rides on the wheel-sided projection 64 of the worm wheel 38. In the second preferred embodiment, on the contrary, the maneuverability of the snow removing machine is highly improved.

Figure 19:
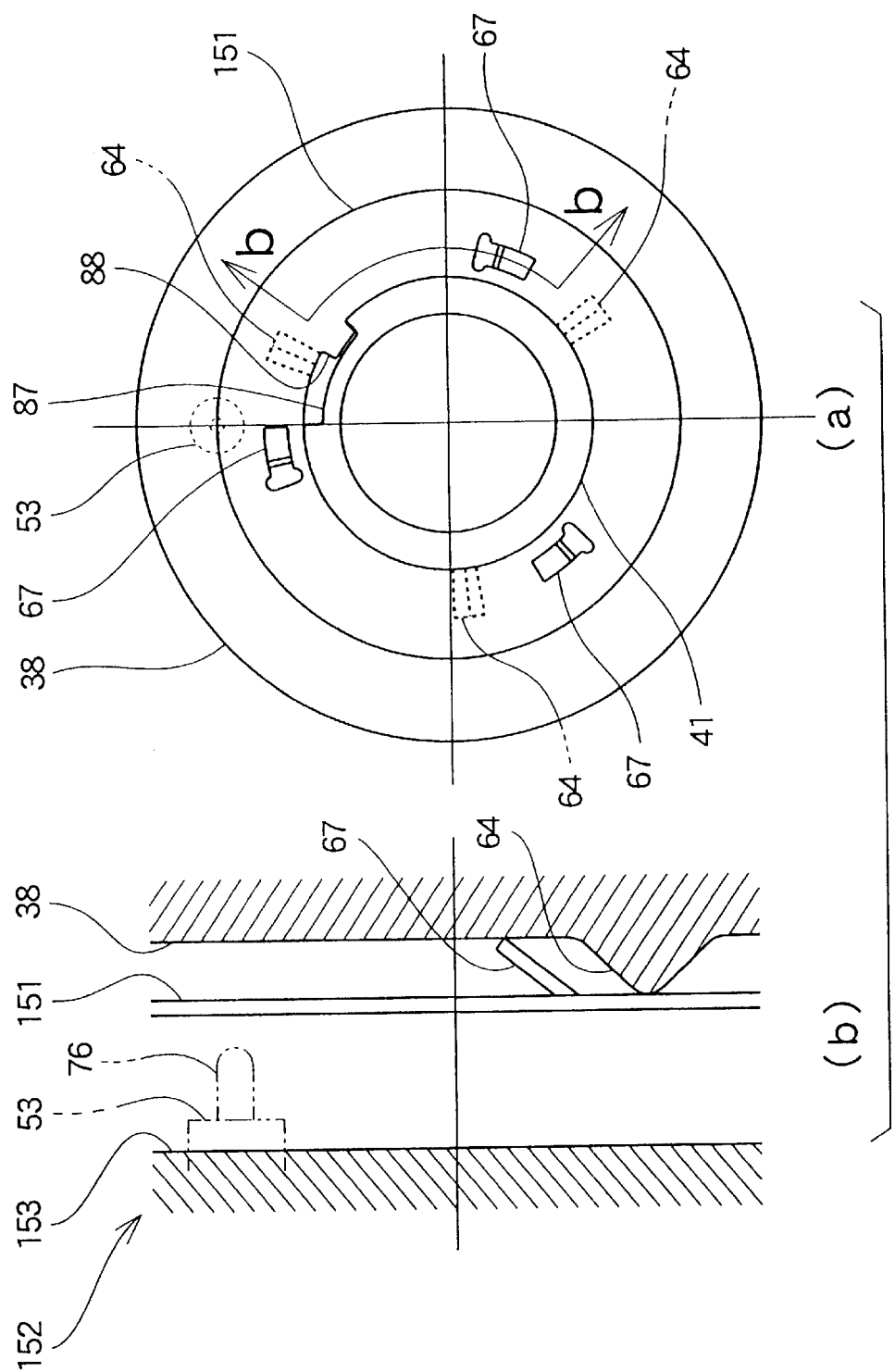
FIG. 19 shows an overload protecting device according to a third embodiment of the present invention, with (a) part being a side elevational view and (b) part being a cross sectional view taken along line b—b of the (a) part.

FIG. 19 is a view for illustrating an auger transmission suited for an overload protecting device of a third preferred embodiment of the present invention, with like component parts bearing the same reference numerals as those used with reference to the first and second preferred embodiments and a detailed description of the like parts being herein omitted for the sake of simplicity.

FIG. 19(a) is a side view of a disk-shaped slide washer 151 (of which detailed description will be described later) and the washer detection switch 53. FIG. 19(b) is a cross sectional view, taken on line E—E of FIG. 19(a), for illustrating a case body 153, the washer detection switch 53, the slide washer 151 and the worm wheel 38.

In this illustrated embodiment, the slide washer 151 is designed not to have all of the case-side projections 71 of the slide washer 45 shown in FIG. 4. The auger transmission 152 includes a case body 153, of a structure corresponding to that the case-side protruding element 78 is removed from the case body 31 of the auger transmission 18 shown in FIG. 6, and the same remaining component parts as the auger transmission 18 except for the case body 153. That is, the overload protecting device 155, of the third preferred embodiment shown in FIG. 20, has a structure corresponding to that the case-side protruding element 78 and the case-side projection 71 of the slide washer 45 are removed from the overload protecting device 60 of the first preferred embodiment shown in FIG. 6.

Figure 20A:
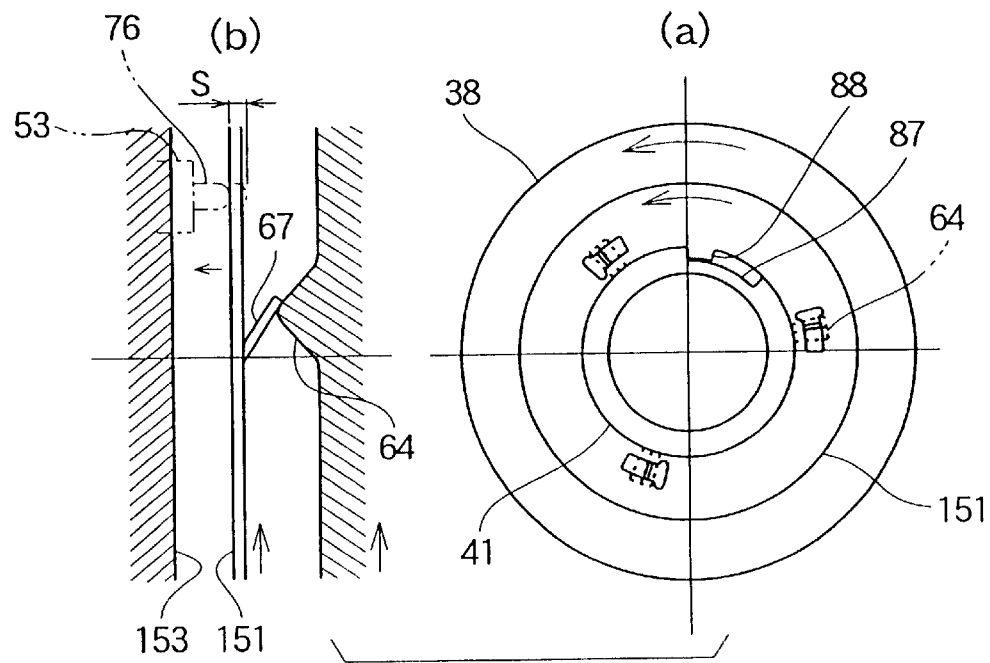
FIGS. 20A and 20B are views illustrating an operation of the overload protecting device shown in FIG. 19.
Figure 20B:
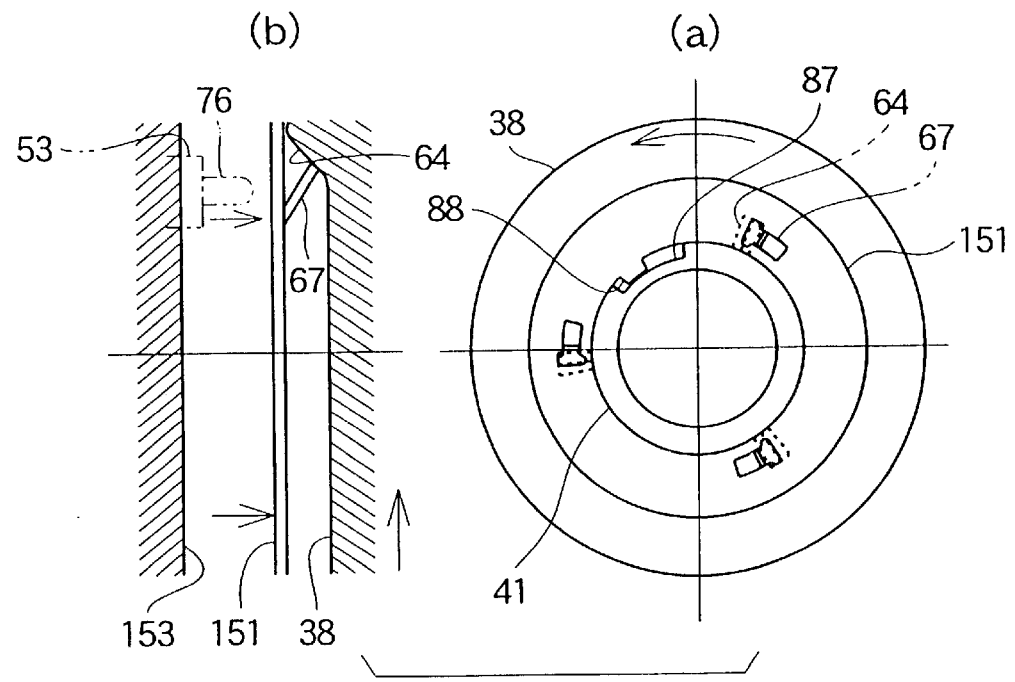

FIGS. 20A and 20B are views for illustrating the operation of the auger transmission for the overload protecting device shown in FIG. 19.

As previously described with respect to FIG. 8, if the auger 23 itself or the power transmission path between the engine 15 and the auger 23 encounter an overload to prevent the rotation of the auger 23 to cause the boss member 41 of the auger transmission to be brought into a nearly locked condition as viewed in FIG. 20A, both the worm wheel 38 and the slide washer 151 rotate clockwise in the same direction as shown by an arrow relative to the boss segment 41. When this occurs, the wheel-side projection 67 slides on the wheel-side protruding segments 64 as viewed in FIG. 20B, and the slide washer 151 is shifted toward the left side thereof. In this instance, the movable element 76 of the washer detection switch 53 is moved for a distance S, resulting on the turning on of the washer detection switch 53. When this takes place, the ignition plug is disenabled as previously described above, thereby stopping the engine operation.

However, even when the ignition spark is not produced by the ignition plug, the engine is hard to immediately stop due to the moment of inertia and hence, the drive shaft 16 shown in FIG. 1, the worm 37 of the worm shaft 36 shown in FIG. 7 and the worm wheel 38 can not be immediately stopped.

In FIG. 20A, the slide washer 151 continues its rotation together with the worm wheel 38 without being immediately stopped. For this reason, when the inwardly extending radial projection 88 of the slide washer 151 is brought into abutting engagement with the end wall of the cutout 87 of the boss member 41, the rotation of the slide washer 151 is disenabled relative to the boss member 41. When this occurs, since the worm wheel 38 is enabled to rotate relative to the slide washer 151, the wheel-side projection 67 slides across the wheel-side protruding segments 64 as seen in FIG. 20B such that the slide washer 151 is shifted rightward as shown by an arrow in FIG. 20B(a) to be released from the washer detection switch 53 which is consequently is turned off. With such a movement, when the power transmission mechanism of the snow removing machines encounters an overload, it is possible to overcome inconvenience caused by re-turning on of the washer detection switch 53.

As described above, once the washer detection switch 53 is turned on and subsequently is turned off, the engine is hardly to start up unless the starter motor is started up.

It will thus be appreciated that the auger transmission 152 (see FIG. 19) of the third preferred embodiment is designed in a configuration corresponding to the structure wherein the case-sided projections 71 of the slide washer 45 and the case-side protruding element 78 of the case body 31 are dispensed with in the auger transmission 18 of the first preferred embodiment and that slide washer 151 and the case body 153 of the auger transmission 152 of the third preferred embodiment shown in FIG. 19 can be manufactured at a lower cost than those of the auger transmission 18 of the first preferred embodiment.

While the prime mover stopper means of the present invention has been shown and described as including relays, the present invention is not limited thereto and may include a control means composed of a computer responsive to a turn-on signal produced by a suitable detecting means for thereby interrupting the electric circuitry coupled to the ignition path. Also, the resilient member may not be limited to the waved leaf spring but may be composed of a dish-shaped spring.

Obviously, various minor changes and modifications of the present invention are possible in the light of the above teaching. It is therefore to be understood that within the scope of the appended claims, the invention may be practiced otherwise than as specifically described.

What is claimed is:

1. An overload protecting device assembled in an auger transmission of a snow removing machine, the device comprising:
   a worm wheel meshing with a worm formed on an input shaft of the auger transmission;
   a cylindrical member engaging with the worm wheel to be rotatable relative thereto and fixedly coupled to an auger shaft for non-rotational relationship;
   a disk located adjacent to the worm wheel for restricting a rotating angle of the cylindrical member and having a plurality of wheel-sided projections facing a plurality of wheel-side protruding segments formed at a side wall of the worm wheel;
   detecting means for detecting movement of the disk toward a side thereof when the wheel-side projections ride on the wheel side protruding segments responsive to rotation of the worm wheel and the cylindrical member relative to one another;
   prime mover stopper means for forcibly stopping operation of a prime mover responsive to a signal delivered from the detecting means; and
   a resilient member urging the disk against the worm wheel,
   whereby a power transmission path between the prime mover and the auger shaft is prevented from encountering an overload.

2. An overload protecting device according to claim 1, wherein the auger transmission includes a case formed with case-side protruding element, and wherein the disk further has a plurality of case-side projections, formed on a rear side opposed to a front surface formed with the wheel-side projections, which are brought into abutting engagement with the case-side protruding element to restrict the rotation of the disk relative to the case.

3. An overload protecting device according to claim 2, wherein the wheel-side projections and the case-side projections are oriented in a clockwise rotational direction of the auger shaft.

4. An overload protecting device according to claim 1, wherein the resilient member includes a waved leaf spring made of an annular thin sheet formed by a wave-forming process.

* * * * *